US012321957B2

(12) United States Patent
Varghese et al.

(10) Patent No.: US 12,321,957 B2
(45) Date of Patent: Jun. 3, 2025

(54) SYSTEM AND METHOD FOR ASSIGNING AGENTS TO CRITICAL/HIGH PRIORITY SUPPLY CHAIN RISK USE CASES

(71) Applicant: ACCENTURE GLOBAL SOLUTIONS LIMITED, Dublin (IE)

(72) Inventors: Vinu Varghese, Bangalore (IN); Saran Prasad, New Delhi (IN); Nirav Jagdish Sampat, Mumbai (IN); Ujjala Chattopadhyay, Bangalore (IN); Christina Catharina De Vries, Red Bank, NJ (US); Selvakuberan Karuppasamy, Chennai (IN); Anil Kumar, Bangalore (IN); Dheeraj Kharya, West Mumbai (IN); Amit Vithoba Patil, Panvel (IN); Vinay Verma, Mumbai (IN); Deepam Biswas, Pune Maharashtra (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 192 days.

(21) Appl. No.: 17/968,676

(22) Filed: Oct. 18, 2022

(65) Prior Publication Data
US 2024/0070689 A1 Feb. 29, 2024

(30) Foreign Application Priority Data
Aug. 31, 2022 (IN) .............................. 202211049726

(51) Int. Cl.
*G06Q 30/0202* (2023.01)
*G06F 40/232* (2020.01)
(Continued)

(52) U.S. Cl.
CPC ....... *G06Q 30/0202* (2013.01); *G06F 40/232* (2020.01); *G06F 40/253* (2020.01);
(Continued)

(58) Field of Classification Search
CPC ......... G06Q 10/06311; G06Q 10/0635; G06Q 10/06316; G06Q 10/103;
(Continued)

(56) References Cited

U.S. PATENT DOCUMENTS 7,693,739 B2 * 4/2010 Schmidtberg .......... G06Q 10/06
705/333
8,036,939 B2 * 10/2011 Gil ...................... H04L 63/0272
705/17
(Continued)

OTHER PUBLICATIONS

Sjaj, Sejal, Automatic Ticket Assignment using Machine Learning and Deep Learning Techniques National College of Ireland, Aug. 2020 (Year: 2020).*
(Continued)

*Primary Examiner* — Scott L Jarrett
(74) *Attorney, Agent, or Firm* — Mannava & Kang, P.C.

(57) ABSTRACT

Systems and methods for managing supply chain of products and services are disclosed herein. A system generates supply chain data based on historical data received from data sources corresponding to supply chain of product or service. Further, system extracts data entity and set of attributes from supply chain data, to determine semantically related data entities. Furthermore, system determines use case corresponding to management of supply chain, based on semantically related data entities. Additionally, system predicts, risk or priority associated with product or service in the supply chain, to generate risks and alerts, based on prediction. Further, system assigns critical and high-priority use case to one or more agents based on a performance score of the one or more agents. Furthermore, system provides insights and suggestions for managing the supply chain of product or service at regional level and global level of supply chain.

15 Claims, 14 Drawing Sheets

(51) Int. Cl.
    *G06F 40/253*     (2020.01)
    *G06F 40/289*     (2020.01)
    *G06F 40/30*     (2020.01)
    *G06Q 10/0631*     (2023.01)
    *G06Q 30/0201*     (2023.01)

(52) U.S. Cl.
    CPC ............ *G06F 40/289* (2020.01); *G06F 40/30* (2020.01); *G06Q 10/063112* (2013.01); *G06Q 30/0201* (2013.01)

(58) Field of Classification Search
    CPC ......... G06Q 10/063112; G06Q 10/067; G06Q 10/06315; G06Q 10/06
    See application file for complete search history.

(56) References Cited

U.S. PATENT DOCUMENTS

| | | | | |
|---|---|---|---|---|
| 8,126,762 | B2* | 2/2012 | Ramachandran | G06Q 10/0635 |
| | | | | 705/7.28 |
| 8,805,716 | B2* | 8/2014 | Michel | G06F 16/252 |
| | | | | 705/7.39 |
| 10,140,444 | B2* | 11/2018 | Venkataraman | G06F 21/6218 |
| 10,262,283 | B2* | 4/2019 | Leidner | G06Q 10/06315 |
| 10,339,440 | B2* | 7/2019 | Trask | G06N 3/098 |
| 10,587,644 | B1* | 3/2020 | Stolte | H04L 63/1433 |
| 10,607,014 | B1* | 3/2020 | Stolte | G06Q 10/0635 |
| 10,896,392 | B2* | 1/2021 | Leidner | G06Q 10/06315 |
| 11,340,906 | B2* | 5/2022 | Ramchandran | G06Q 10/067 |
| 11,354,609 | B2* | 6/2022 | Javaid | G06Q 10/06315 |
| 11,392,875 | B2* | 7/2022 | Carstens | G06F 16/288 |
| 11,461,555 | B2* | 10/2022 | Ekmekci | G06F 18/22 |
| 11,580,475 | B2* | 2/2023 | Retna | G06N 20/00 |
| 11,610,670 | B1* | 3/2023 | Chen | G16H 20/40 |
| 11,645,719 | B2* | 5/2023 | Ward | G06F 16/904 |
| | | | | 705/4 |
| 11,704,552 | B2* | 7/2023 | Sim | G06N 3/08 |
| | | | | 706/25 |
| 11,763,075 | B1* | 9/2023 | Sarrafzadeh | G06F 40/12 |
| | | | | 715/235 |
| 2003/0236677 | A1* | 12/2003 | Casati | G06Q 10/0639 |
| | | | | 705/348 |
| 2004/0068431 | A1* | 4/2004 | Smith | G06Q 10/10 |
| | | | | 705/7.14 |
| 2008/0015871 | A1* | 1/2008 | Eder | G06Q 40/00 |
| | | | | 705/348 |
| 2008/0027841 | A1* | 1/2008 | Eder | G06Q 40/00 |
| | | | | 705/35 |
| 2011/0218843 | A1* | 9/2011 | Goel | G06Q 10/067 |
| | | | | 705/348 |
| 2012/0221485 | A1* | 8/2012 | Leidner | G06Q 40/08 |
| | | | | 705/36 R |
| 2012/0221486 | A1* | 8/2012 | Leidner | G06Q 40/08 |
| | | | | 705/36 R |
| 2013/0246130 | A1* | 9/2013 | Michel | G06F 16/252 |
| | | | | 707/769 |
| 2014/0018950 | A1* | 1/2014 | Linton | G05B 19/418 |
| | | | | 706/47 |
| 2014/0018951 | A1* | 1/2014 | Linton | G06N 5/02 |
| | | | | 700/105 |
| 2014/0278706 | A1* | 9/2014 | Leidner | G06Q 10/06315 |
| | | | | 705/7.25 |
| 2016/0048788 | A1* | 2/2016 | Martin | H04L 67/10 |
| | | | | 705/7.25 |
| 2016/0247061 | A1* | 8/2016 | Trask | G06N 3/08 |
| 2016/0371618 | A1* | 12/2016 | Leidner | G06F 16/2246 |
| 2017/0213172 | A9* | 7/2017 | Leidner | G06Q 10/06315 |
| 2017/0262621 | A1* | 9/2017 | Venkataraman | G06Q 10/06 |
| 2018/0108022 | A1* | 4/2018 | Bandera | G06Q 10/06316 |
| 2018/0197128 | A1* | 7/2018 | Carstens | G06F 16/9024 |
| 2019/0172147 | A1* | 6/2019 | Ward | G06Q 40/08 |
| 2019/0311312 | A1* | 10/2019 | Leidner | G06Q 10/06315 |
| 2020/0202268 | A1* | 6/2020 | Retna | G06N 20/00 |
| 2021/0173711 | A1* | 6/2021 | Crabtree | G06F 16/9024 |
| 2021/0286989 | A1* | 9/2021 | Zhong | G06F 40/177 |
| 2022/0092492 | A1* | 3/2022 | Silverstein | G06N 3/08 |
| 2022/0138655 | A1* | 5/2022 | Kinai | G06Q 10/06375 |
| | | | | 705/7.25 |
| 2022/0188753 | A1* | 6/2022 | Dudas | G06Q 10/08 |
| 2023/0066770 | A1* | 3/2023 | Martinovych | G06Q 10/06375 |
| 2023/0237404 | A1* | 7/2023 | Jayathirtha | G06Q 10/063 |
| | | | | 705/7.28 |
| 2023/0289729 | A1* | 9/2023 | Ansar | G06Q 10/101 |
| 2024/0020610 | A1* | 1/2024 | Thurman | G06N 5/022 |

OTHER PUBLICATIONS

Remedy Help Desk 5.5—User's Guide Remedy, Jun. 2003 (Year: 2003).*
Cristian, Matei et al., A Study in the Automation of Service Ticket Recognition using Natural Language Processing IEEE, 2019 International Conference on Software, Telecommunications and Computer Networks (SoftCOM), 2019 (Year: 2019).*
Using Business Activity Monitoring ES Dashboard Adobe, Jul. 2007 (Year: 2007).*
Agarwal, Shivali et al., Automated Assignment of Helpdesk Email Tickets: An Artificial Intelligence Life-Cycle Case Study Association for the Advancement of Artificial Intelligence, Fall 2020 (Year: 2020).*
Gupta, Pankaj et al., Replicated Siamese LSTM in Ticketing System for Similarity Learning and Retrieval in Asymmetric Texts Jul. 2018 (Year: 2018).*

* cited by examiner

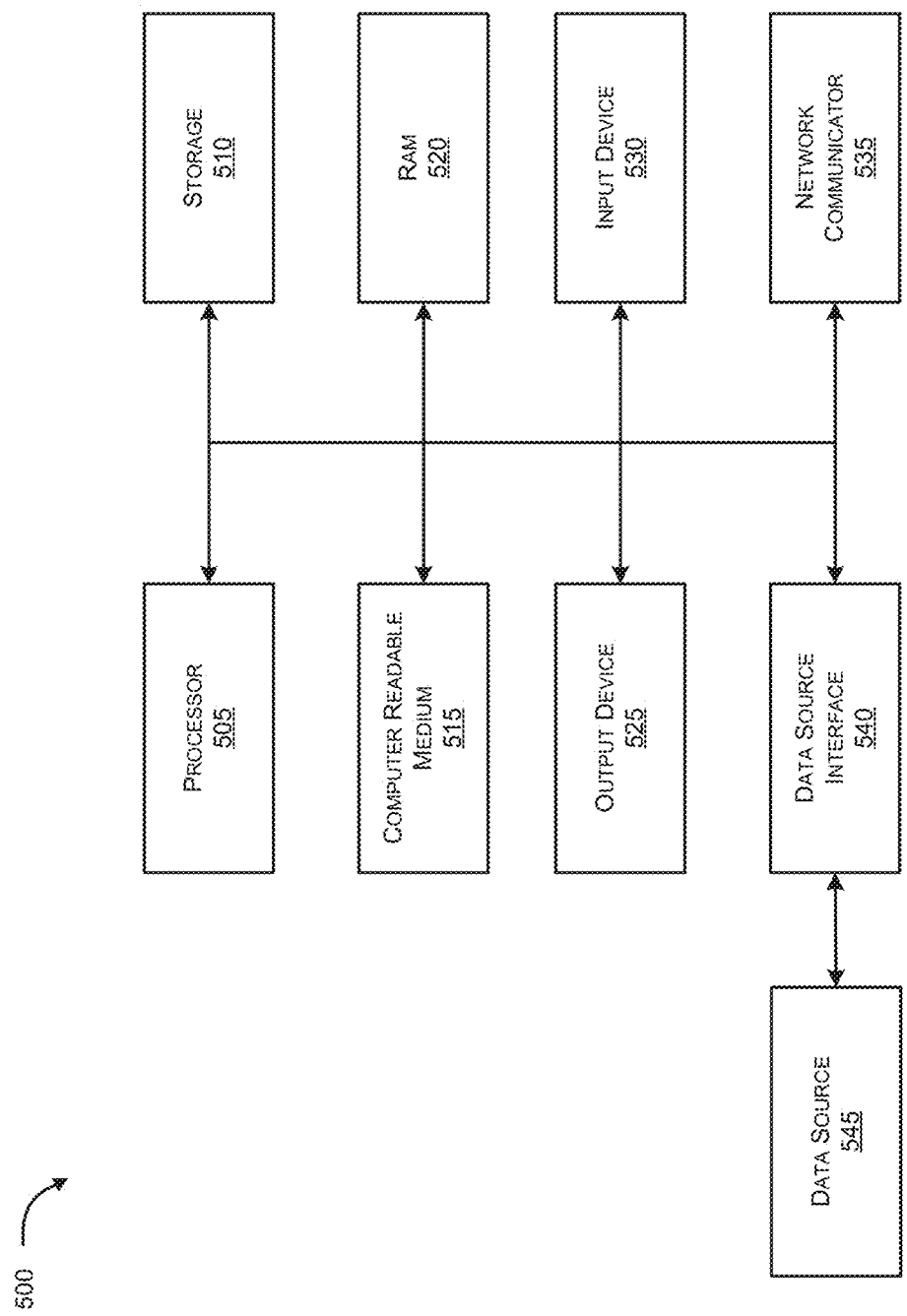

SYSTEM AND METHOD FOR ASSIGNING AGENTS TO CRITICAL/HIGH PRIORITY SUPPLY CHAIN RISK USE CASES

PRIORITY CLAIM

This patent application claims foreign priority to Indian Patent Application number 202211049726, filed on Aug. 31, 2022, which is incorporated by reference in its entirety.

BACKGROUND

Generally, products and services may be fulfilled by manufacturers/(re-) sellers/affiliates/distributors/suppliers, and providers, respectively through a supply chain. The products and services that are being passed through the supply chain, may be conveyed, or stored via various hauling facilities and distribution facilities, such as warehouses, fulfillment centers, and various delivery modes (physical and digital). Organizations have access to a large amount of data. With the advent of smart connected devices, wearable technologies, Internet of Things (IoT), and the like, the amount of data available to the organizations such as planning, overseeing, managing, and operating a value chain network may have eventually increased. Further, as organizations implement Customer Relationship Management (CRM) platforms, Enterprise Resource Planning (ERP) platforms, operations platforms, Information Technology (IT) platforms, advanced analytics, and other platforms, organizations have access to an increasingly wide array of other large data sets, such as marketing data, sales data, operational data, information technology data, performance data, customer data, financial data, market data, pricing data, supply chain data, and the like, including data sets generated by or for the organization and third-party data sets.

The presence of a large amount of data and data of new types offers many opportunities for organizations to achieve competitive advantages. However, the large amount of data and data of new types may also present problems, such as complexity and volume, such that users can be overloaded, missing opportunities for insights. However, in conventional systems, there may be no automated, compliant, and connected systems to visualize the end-to-end supply chain, which in turn leads to lower productivity, higher cost to serve, and dissatisfied customers for enterprises. Further, there may be no platform to connect with customers' or, partners' data to have seamless integration for internal and external products of the organization.

Therefore, there is a need for systems and methods for addressing at least the above-mentioned problems in the existing approaches for managing a supply chain of products and services, that allow enterprises not only to obtain/gather data in one place, but to convert the data into insights and or visualizations, and to translate the insights and visualizations into well-informed decisions and timely execution of efficient operations.

SUMMARY

An embodiment of present disclosure includes a system, the system generates supply chain data based on historical data received from one or more data sources corresponding to a supply chain associated with at least one of a product and a service. Further, the system extracts at least one data entity and a set of attributes from the generated supply chain data, to determine semantically related data entities of the extracted at least one data entity, based on a context of the historical data and ground truth data corresponding to the extracted at least one data entity. Furthermore, the system determines at least one use case corresponding to a management of the supply chain, based on the determined semantically related data entities. Additionally, the system predicts, from the determined at least one use case, at least one of a risk and a priority associated with the at least one of product and service in the supply chain, to generate risks and alerts, based on the prediction. Further, the system assigns critical and high-priority use case in the predicted at least one of risk and priority associated with the at least one of product and service, to one or more agents based on a performance score of the one or more agents. Furthermore, the system provides insights and suggestions for managing the supply chain of the at least one of product and service at a regional level and a global level of the supply chain.

Further, for generating the supply chain data, the system derives the attributes corresponding to a class associated with the at least one use case. Further, the system generates at least one of at least one standard name and the ground truth data corresponding to class properties associated with the class. Furthermore, the system determines dense vector embeddings between the attributes and the corresponding class, based on the generated at least one of at least one standard name and the ground truth data. Additionally, the system determines a semantic score for deriving similarity metrics between each attribute and the ground truth data, based on the determined dense vector embeddings.

Furthermore, for extracting at least one data entity and attributes, the system extracts entity properties from the extracted at least one data entity. Further, the system generates an entity graph comprising nodes and edges corresponding to the extracted at least one data entity and the entity properties. Furthermore, the system determines one or more relationships of the semantically related data entities, based on the generated entity graph. Additionally, the system maps the determined one or more relationships to the at least one use case.

Additionally, for assigning critical and high-priority use case to one or more agents, the system retrieves one or more work notes corresponding to the one or more agents, from the one or more data sources. Further, the system extracts noun chunks from the retrieved work notes, to identify critical parameters associated with a performance of the one or more agents. Furthermore, the system generates a dependency graph with the identified parameters for each of the work notes. Additionally, the system identifies at least one of spelling mistake, communication, re-open counts of use case, time for handling the number of cases, based on generating the dependency graph. Further, the system classifies each of the work notes into a standard work note and a non-standard work note, based on the identification. Furthermore, the system derives a centricity score corresponding to a resource assigned for the one or more agents. Additionally, the system generates the performance score of the one or more agents based on the classification of the work notes, the centricity score, and a resolution of the work notes by the one or more agents.

Further, for extracting the at least one data entity, the system maps a parent class and a child class corresponding to the at least one data entity into a supply chain-based ontology schema. Further, the system maps the parent class to the at least one use case.

Another embodiment of the present disclosure may include a method, the method includes generating supply chain data based on historical data received from one or more data sources corresponding to a supply chain associated with at least one of a product and a service. Further, the method includes extracting at least one data entity and a set of attributes from the generated supply chain data, to determine semantically related data entities of the extracted at least one data entity, based on a context of the historical data and ground truth data corresponding to the extracted at least one data entity. Furthermore, the method includes determining at least one use case corresponding to a management of the supply chain, based on the determined semantically related data entities. Additionally, the method includes predicting, from the determined at least one use case, at least one of a risk and a priority associated with the at least one of product and service in the supply chain, to generate risks and alerts, based on the prediction. Further, the method includes assigning critical and high-priority use case in the predicted at least one of risk and priority associated with the at least one of product and service, to one or more agents based on a performance score of the one or more agents. Furthermore, the method includes providing insights and suggestions for managing the supply chain of the at least one of product and service at a regional level and a global level of the supply chain.

Further, for generating the supply chain data, the method includes deriving the attributes corresponding to a class associated with the at least one use case. Further, the method includes generating at least one of at least one standard name and the ground truth data corresponding to class properties associated with the class. Furthermore, the method includes determining dense vector embeddings between the attributes and the corresponding class, based on the generated at least one of at least one standard name and the ground truth data. Additionally, the method includes determining a semantic score for deriving similarity metrics between each attribute and the ground truth data, based on the determined dense vector embeddings.

Furthermore, for extracting at least one data entity and attributes, the method includes extracting entity properties from the extracted at least one data entity. Further, the method includes generating an entity graph comprising nodes and edges corresponding to the extracted at least one data entity and the entity properties. Furthermore, the method includes determining one or more relationships of the semantically related data entities, based on the generated entity graph. Additionally, the method includes mapping the determined one or more relationships to the at least one use case.

Additionally, for assigning critical and high-priority use case to one or more agents, the method includes retrieving one or more work notes corresponding to the one or more agents, from the one or more data sources. Further, the method includes extracting noun chunks from the retrieved work notes, to identify critical parameters associated with a performance of the one or more agents. Furthermore, the method includes generating a dependency graph with the identified parameters for each of the work notes. Additionally, the method includes identifying at least one of a spelling mistake, communication, re-open counts of use case, handling time for a case, based on generating the dependency graph. Further, the method includes classifying each of the work notes into a standard work note and a non-standard work note, based on the identification. Furthermore, the method includes deriving a centricity score corresponding to the resource assigned. Additionally, the method includes generating the performance score of the one or more agents based on the classification of the work notes, the centricity score, and a resolution of the work notes by the one or more agents.

Further, for extracting the at least one data entity, the method includes mapping a parent class and a child class corresponding to the at least one data entity into a supply chain-based ontology schema. Further, the method includes mapping the parent class to the at least one use case.

Yet another embodiment of the present disclosure may include a non-transitory computer-readable medium comprising machine-executable instructions that may be executable by a processor to generate supply chain data based on historical data received from one or more data sources corresponding to a supply chain associated with at least one of a product and a service. Further, the processor extracts at least one data entity and a set of attributes from the generated supply chain data, to determine semantically related data entities of the extracted at least one data entity, based on a context of the historical data and ground truth data corresponding to the extracted at least one data entity. Furthermore, the processor determines at least one use case corresponding to a management of the supply chain, based on the determined semantically related data entities. Additionally, the processor predicts, from the determined at least one use case, at least one of a risk and a priority associated with the at least one of product and service in the supply chain, to generate risks and alerts, based on the prediction. Further, the processor assigns critical and high-priority use case in the predicted at least one of risk and priority associated with the at least one of product and service, to one or more agents based on a performance score of the one or more agents. Furthermore, the processor provides insights and suggestions for managing the supply chain of the at least one of product and service at a regional level and a global level of the supply chain.

BRIEF DESCRIPTION OF DRAWINGS

FIG. 5 illustrates a hardware platform for an implementation of the disclosed system, according to an example embodiment of the present disclosure.

DETAILED DESCRIPTION

Figure 1:
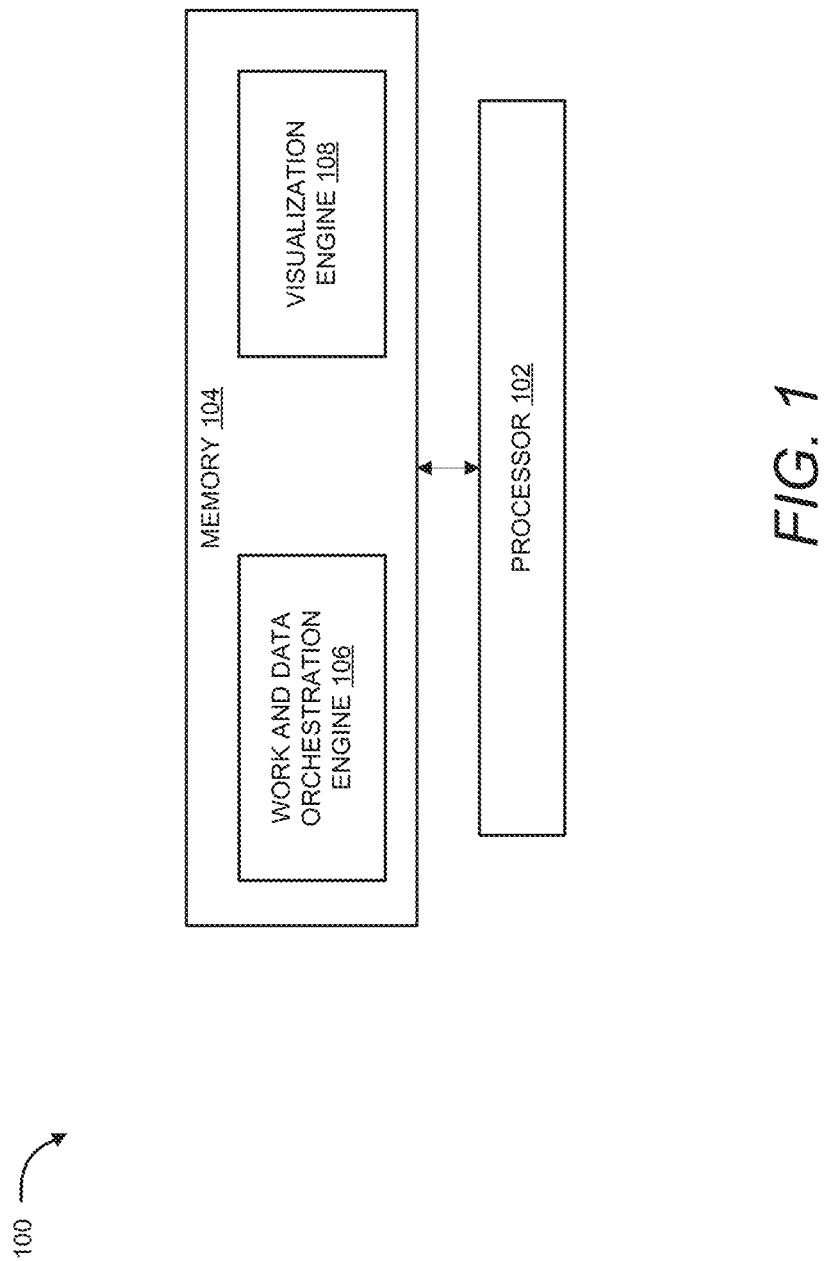
FIG. 1 illustrates an exemplary block diagram representation of a system for managing a supply chain of products and services, according to an example embodiment of the present disclosure.

For simplicity and illustrative purposes, the present disclosure is described by referring mainly to examples thereof. The examples of the present disclosure described herein may be used together in different combinations. In the following description, details are set forth in order to provide an understanding of the present disclosure. It will be readily apparent, however, that the present disclosure may be practiced without limitation to all these details. Also, throughout the present disclosure, the terms "a" and "an" are intended to denote at least one example of a particular element. The terms "a" and "an" may also denote more than one example of a particular element. As used herein, the term "includes" means includes but not limited to, the term "including" means including but not limited to. The term "based on" means based at least in part on, the term "based upon" means based at least in part upon, and the term "such as" means such as but not limited to. The term "relevant" means closely connected or appropriate to what is being performed or considered.

Various embodiments describe systems and methods for managing a supply chain of products and services. The system generates supply chain data based on historical data received from one or more data sources corresponding to a supply chain associated with at least one of a product and a service. Further, the system extracts at least one data entity and a set of attributes from the generated supply chain data, to determine semantically related data entities of the extracted at least one data entity, based on a context of the historical data and ground truth data corresponding to the extracted at least one data entity. Furthermore, the system determines at least one use case corresponding to a management of the supply chain, based on the determined semantically related data entities. Additionally, the system predicts, from the determined at least one use case, at least one of a risk and a priority associated with the at least one of product and service in the supply chain, to generate risks and alerts, based on the prediction. Further, the system assigns critical and high-priority use case in the predicted at least one of risk and priority associated with the at least one of product and service, to one or more agents based on a performance score of the one or more agents. Furthermore, the system provides insights and suggestions for managing the supply chain of the at least one of product and service at a regional level and a global level of the supply chain.

Further, for generating the supply chain data, the system derives the attributes corresponding to a class associated with the at least one use case. Further, the system generates at least one of at least one standard name and the ground truth data corresponding to class properties associated with the class. Furthermore, the system determines dense vector embeddings between the attributes and the corresponding class, based on the generated at least one of at least one standard name and the ground truth data. Additionally, the system determines a semantic score for deriving similarity metrics between each attribute and the ground truth data, based on the determined dense vector embeddings.

Furthermore, for extracting at least one data entity and attributes, the system extracts entity properties from the extracted at least one data entity. Further, the system generates an entity graph comprising nodes and edges corresponding to the extracted at least one data entity and the entity properties. Furthermore, the system determines one or more relationships of the semantically related data entities, based on the generated entity graph. Additionally, the system maps the determined one or more relationships to the at least one use case.

Additionally, for assigning critical and high-priority use case to one or more agents, the system retrieves one or more work notes corresponding to the one or more agents, from the one or more data sources. Further, the system extracts noun chunks from the retrieved work notes, to identify critical parameters associated with a performance of the one or more agents. Furthermore, the system generates a dependency graph with the identified parameters for each of the work notes. Additionally, the system identifies at least one of spelling mistake, communication, re-open counts of use case, time for handling the number of cases, based on generating the dependency graph. Further, the system classifies each of the work notes into a standard work note and a non-standard work note, based on the identification. Furthermore, the system derives a centricity score corresponding to a resource assigned for the one or more agents. Additionally, the system generates the performance score of the one or more agents based on the classification of the work notes, the centricity score, and a resolution of the work notes by the one or more agents.

Further, for extracting the at least one data entity, the system maps a parent class and a child class corresponding to the at least one data entity into a supply chain-based ontology schema. Further, the system maps the parent class to the at least one use case.

Embodiments disclosed herein may provide a method and system to improve supply chain management accuracy with limited manual intervention. The present disclosure may enable efficient execution of the supply chain through intelligent task allocation. The present disclosure may provide a method and system for enhanced customer engagement with informative portals, analytics, and cockpit visualizations. The present disclosure may provide the method and system to deliver productivity savings through the enterprise-to-enterprise Human and Machine (H+M) orchestration. The present disclosure may provide the method and system to integrate and consolidate data across disparate planning systems, providing overall visibility for optimal planning across the entire supply chain at a regional and a global level. The present disclosure may provide the method and system to capture data entities from supply chain data, based on the context and not restricted to a noun phrases or custom entity identification.

FIG. 1 illustrates an exemplary block diagram representation of a system 100 for managing a supply chain of products and services, according to an example embodiment of the present disclosure. The system 100 may be implemented by way of a single device or a combination of multiple devices that may be operatively connected or networked together. The system 100 may be implemented in hardware or a suitable combination of hardware and software. The system 100 includes a processor 102 and a memory 104. The memory 104 may include work and data orchestation engine 106, and a visualization engine 108.

The system 100 may be a hardware device including the processor 102 executing machine-readable program instructions to manage the supply chain of products and services. Execution of the machine-readable program instructions by the processor 102 may enable the proposed system 100 to manage the supply chain of products and services. The "hardware" may comprise a combination of discrete components, an integrated circuit, an application-specific integrated circuit, a field-programmable gate array, a digital signal processor, or other suitable hardware. The "software" may comprise one or more objects, agents, threads, lines of code, subroutines, separate software applications, two or more lines of code, or other suitable software structures operating in one or more software applications or on one or more processors. The processor 102 may include, for example, microprocessors, microcomputers, microcontrollers, digital signal processors, central processing units, state machines, logic circuits, and/or any devices that manipulate data or signals based on operational instructions. Among other capabilities, processor 102 may fetch and execute computer-readable instructions in a memory operationally coupled with system 100 for performing tasks such as data processing, input/output processing, data entity extraction, and/or any other functions. Any reference to a task in the present disclosure may refer to an operation being or that may be performed on data.

In an example embodiment, the processor 102 may execute the work and data orchestration engine 106 to generate supply chain data based on historical data received from one or more data sources (not shown in FIG. 1) corresponding to a supply chain associated with at least one of a product and a service. For generating the supply chain data, the processor 102 may derive the attributes corresponding to a class associated with the at least one use case. for example, use case includes, but is not limited to, goods in transit, data security for multi-tenant clients, delivery assurance, global planning, and the like.

Further, the processor 102 may generate at least one of at least one standard name and ground truth data corresponding to class properties associated with the class. The ground truth data correspond to at least one of pre-defined data and pre-defined standard class names for class properties associated with the class. Furthermore, the processor 102 may determine dense vector embeddings between the attributes and the corresponding class, based on the generated at least one of at least one standard name and the ground truth data. Additionally, the processor 102 may determine a semantic score for deriving similarity metrics between each attribute and the ground truth data, based on the determined dense vector embeddings.

In an example embodiment, the processor 102 may execute the work and data orchestration engine 106 to extract at least one data entity and a set of attributes from the generated supply chain data, to determine semantically related data entities of the extracted at least one data entity, based on a context of the historical data and the ground truth data corresponding to the extracted at least one data entity. The ground truth data correspond to at least one of pre-defined data and pre-defined standard class names for class properties associated with the class. For extracting at least one data entity and attributes, the processor 102 may extract entity properties from the extracted at least one data entity.

Further, the processor 102 may generate an entity graph comprising nodes and edges corresponding to the extracted at least one data entity and the entity properties. Furthermore, the processor 102 may determine one or more relationships of the semantically related data entities, based on the generated entity graph. Additionally, the processor 102 may map the determined one or more relationships to the at least one use case. For extracting the at least one data entity, the processor 102 may map a parent class and a child class corresponding to the at least one data entity into a supply chain-based ontology schema. Further, the processor 102 may map the parent class to the at least one use case.

In an example embodiment, the processor 102 may execute the work and data orchestration engine 106 to determine at least one use case corresponding to a management of the supply chain, based on the determined semantically related data entities. In an embodiment, the at least one use case corresponds to, but is not limited to a warehouse, a product management, a purchase history, an inventory management, a supply chain, and the like.

In an example embodiment, the processor 102 may execute the work and data orchestration engine 106 to predict, from the determined at least one use case, at least one of a risk and a priority associated with the at least one of product and service in the supply chain, to generate risks and alerts, based on the prediction.

In an example embodiment, the processor 102 may execute the work and data orchestration engine 106 to assign critical and high-priority use case in the predicted at least one of risk and priority associated with the at least one of product and service, to one or more agents based on a performance score of the one or more agents.

For assigning critical and high-priority use case to one or more agents, the processor 102 may retrieve one or more work notes corresponding to the one or more agents, from the one or more data sources. Further, the processor 102 may extract noun chunks from the retrieved work notes, to identify critical parameters associated with a performance of the one or more agents. The noun chunks are extracted using, but not limited to, a Natural Language Processing (NLP) technique, a text analytics technique, and the like. Furthermore, the processor 102 may generate a dependency graph with the identified parameters for each of the work notes. Additionally, the processor 102 may identify at least one of spelling mistake, communication, re-open counts of use case, time for handling the number of cases, based on generating a dependency graph. Further, the processor 102 may classify each of the work notes into a standard work note and a non-standard work note, based on the identification. Furthermore, the processor 102 may derive a centricity score corresponding to a resource assigned for the one or more agents. Additionally, the processor 102 may generate the performance score of the one or more agents based on the classification of the work notes, the centricity score, and a resolution of the work notes by the one or more agents.

In an example embodiment, the processor 102 may execute the visualization engine 108 to provide insights and suggestions for managing the supply chain of the at least one of product and service at a regional level and a global level of the supply chain. In an example embodiment, the insights include information associated with, but are not limited to, goods in transit, reverse logistics, track and trace, field returns, return merchandise authorization, triage, testing, repair, rework, refurbishment, distribution, inspection, refund, transfer, work order, a delivery address issue corresponding to the at least one of product and service, and the like.

Figure 2:
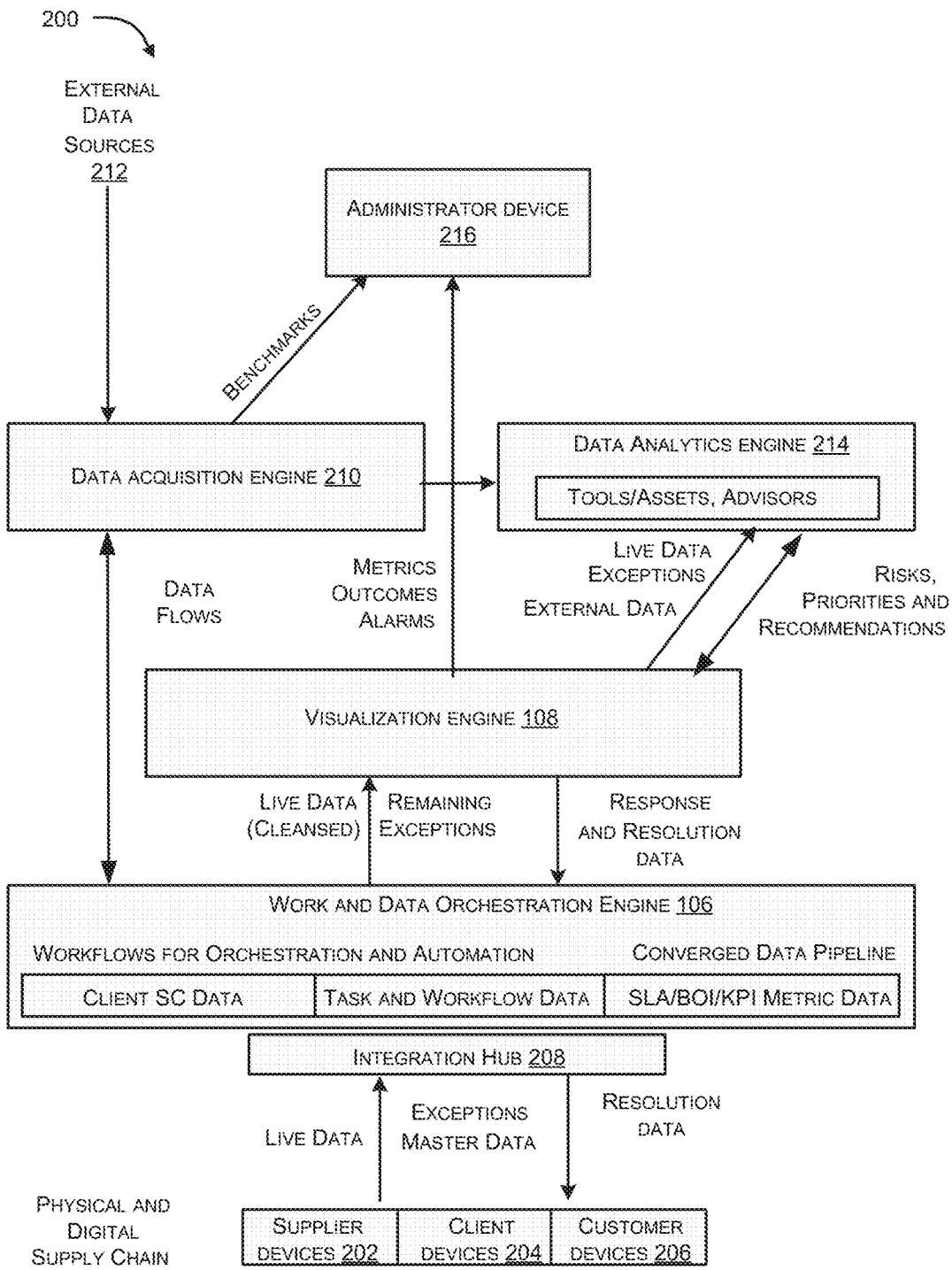
FIG. 2 illustrates an exemplary block diagram representation of a system architecture for managing a supply chain of products and services, according to an example embodiment of the present disclosure.

FIG. 2 illustrates an exemplary block diagram representation of a system architecture 200 for managing a supply chain of products and services, according to an example embodiment of the present disclosure.

The system architecture 200 may correspond to a supply chain platform (e.g., a cloud-based platform) for automation and workflow orchestration of various supply chain functionalities. The system architecture 200 (i.e., network architecture) may include one or more supplier devices 202, one or more client devices 204, one or more customer devices 206, communicatively coupled to an integration hub 208. The one or more supplier devices 202, one or more client devices 204, and one or more customer devices 206 may include at least one of, but not limited to, Supply Chain (SC) or Integration (IX) applications, and the like. Further, the one or more supplier devices 202, one or more client devices 204, and one or more customer devices 206 may be communicatively connected to one or more business networks, one or more supply chain control towers, and the like. Further, the one or more supplier devices 202, one or more client devices 204, and one or more customer devices 206 may provide live data, exceptions master data to the integration hub 208, and receive resolution data from the integration hub 208 through the work and data orchestration engine 106. The integration hub 208 may correspond to a platform for connecting with customers, partners, and other data systems to include a seamless integration for internal and external products.

In an example embodiment, a data acquisition engine 210 may obtain or retrieve the historical data corresponding to the supply chain, from one or more data sources 212. The data acquisition engine 210 may provide the historical data to the work and data orchestration engine 106. The work and data orchestration engine 106 may generate client supply chain data, task, and workflow data, and Business Operations Intelligence (BOI)/Key Performance Indicator (KPI)/Service Level Agreements (SLA) metric data, from the historical data, the live data, and the exceptions master data. Further, the work and data orchestration engine 106 may also handle tasks such as defining, configuring, managing tickets, and automating the workflows of the supply chain associated with the tickets. Further, the work and data orchestration engine 106 may function as a common engagement platform for human-machine and machine-machine interaction. Further, the work and data orchestration engine 106 may pre-process (i.e., clean) the live data and provide the cleaned data and remaining exceptions to the visualization engine 108.

In an example embodiment, the visualization engine 108 may be associated with the memory 104. Further, the visualization engine 108 may also be associated with supply chain cockpits of the one or more supplier devices 202, one or more client devices 204, and one or more customer devices 206. The supply chain cockpits may be an interface or an application for one or more servers (not shown) associated with the one or more supplier devices 202, one or more client devices 204, and one or more customer devices 206. Further, the visualization engine 108 may provide the cleaned live data, exceptions data, and external/historic data to a data analytics engine 214.

In an example embodiment, the data analytics engine 214 may extract, transform, and load the live data, exceptions data, and external/historic data. The data analytics engine 214 may enable authorized data access for data preparation through data cleansing, quality check, data blending, and transformations of the live data, exceptions data, and external/historic data. The data analytics engine 214 may include processing capability to ingest batch or stream the live data, exceptions data, and external/historic data. The data analytics engine 214 may support data discovery and data exploration to power insights leveraging advanced analytics. Further, the data analytics engine 214 may also include Artificial Intelligence (AI) algorithms for processing the data. Furthermore, the data analytics engine 214 may enable intelligent insights, reporting, analytics, and machine learning. The data analytics engine 214 may output risks, priorities, intelligent insights, reports, and recommendations related to the supply chain. The output from the data analytics engine 214 may be provided to the visualization engine 108.

The visualization engine 108 may display via a display, the risks, priorities, intelligent insights, reports, and recommendations related to the supply chain. Further, the risks, priorities, intelligent insights, reports, and recommendations related to the supply chain may be provided to an administrator device 216. Further, the data acquisition engine 210 may provide benchmark data to the administrator device 216.

The system architecture 200 may provide orchestration of assisted query and request resolution, guided (human-driven) case resolution, orchestrated (machine-driven) case resolution, and Human and Machine (H+M) workforce optimization. Further, the system architecture 200 may enable intelligence in managing the supply chain through predictive and impact analysis, scenario modeling, and what-if simulation, and prescriptive (sense and recommend). The system architecture 200 may provide visibility of metric insights (data warehouse based), functional insights (supply chain cockpits), and cross-functional insights (supply chain control tower)/cross-network insights. The insights may be based on a blockchain distributed ledger.

Figure 3:
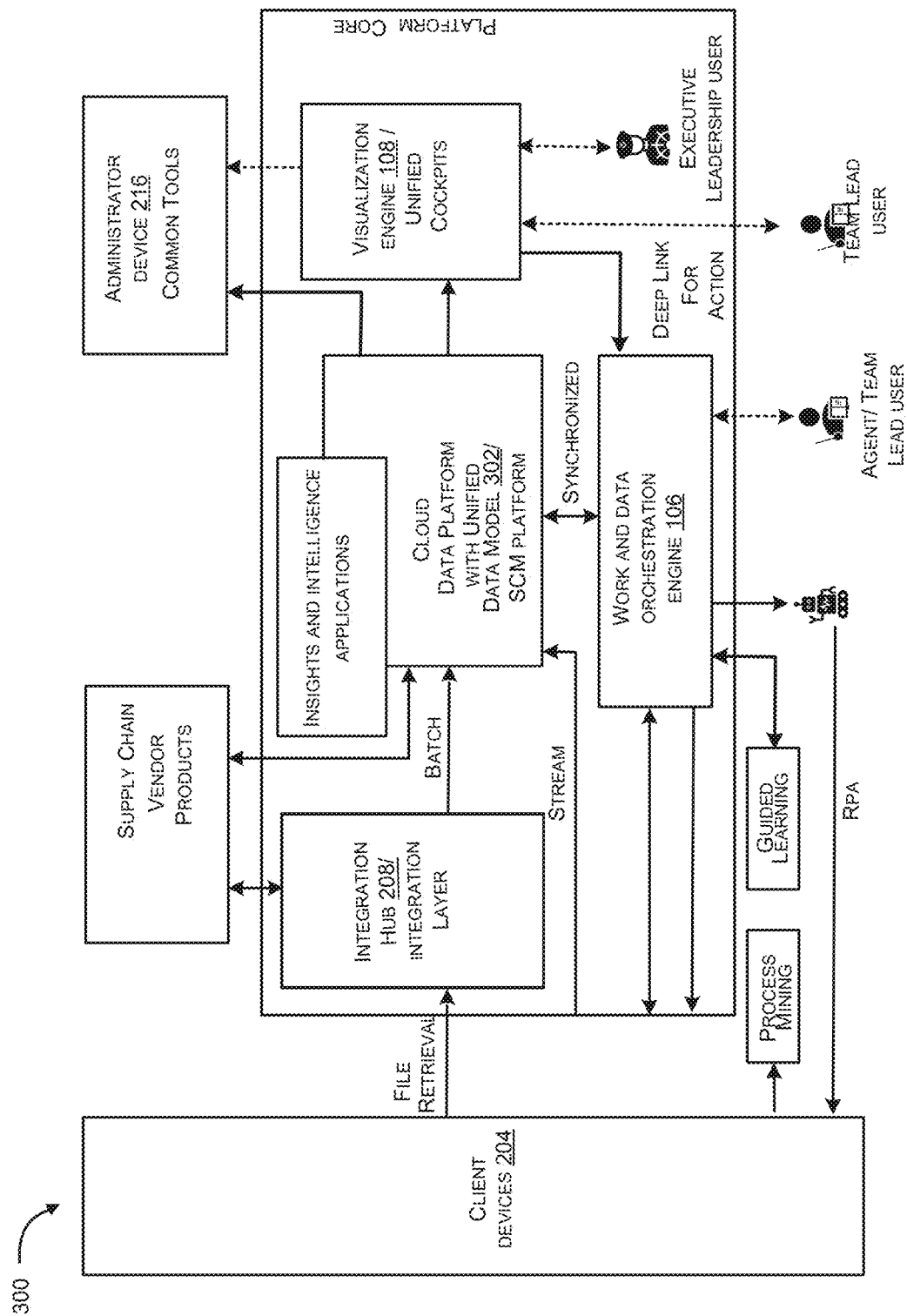
FIG. 3 illustrates an exemplary block diagram representation of a functional architecture for managing a supply chain of products and services, according to an example embodiment of the present disclosure.

FIG. 3 illustrates an exemplary block diagram representation of a functional architecture 300 for managing a supply chain of products and services, according to an example embodiment of the present disclosure.

The functional architecture 300 may correspond to system architecture 200 with functional blocks. The functional architecture 300 be implemented as a broad alignment with Supply Chain and Operations (SC and O) Functional (Fn) networks. The functional architecture 300 may be implemented in Finance and Accounting (F and A) and Human Resource (HR) technology, and collaborated with offering, Inflow, and Infiltration (I&I), and delivery teams. The functional architecture 300 may implement supply demand disruption alerts, supplier delivery assurance (post order follow-up), internal Estimated Time of Arrival (iETA) alerts, supplier onboarding, inventory re-deployment, and the like. Further, the functional architecture 300 provides I&I applications such as supply-demand disruption, supplier delivery assurance, and iETA.

Further, modular components can stand alone or synchronize data with one consistent, unified data model 302 (digital decoupling and data aggregation). The functional architecture 300 may be implemented in any client landscape and deliver functionality for any supply chain/control tower use case. The functional architecture 300 may include supply chain functional architects, data, Artificial Intelligence (AI)/Machine Learning (ML), technical and integration architects and build resources, accelerates time to value as the base of assets and experience increases around a consistent core platform stack.

The processor 102 may execute an entity detection framework to identify use case-specific data entities using files from one or more data sources 212 or client device 204. The processor 102 may extract entity into supply chain-specific ontology schema. Further, the processor 102 may auto-detect applicable use cases using the ontology schema with the correct attribute. Further, the processor 102 may determine the semantic relatedness of the use cases. Furthermore, the processor 102 may leverage the output of identity detection to load data into a standardized model for supply chain use cases. The processor 102 provides information into a visualization layer with standard case information across all use cases enabling cross-functional decision-making. Further, the processor 102 may assign critical and high-priority cases to one or more agents.

Figure 4A:
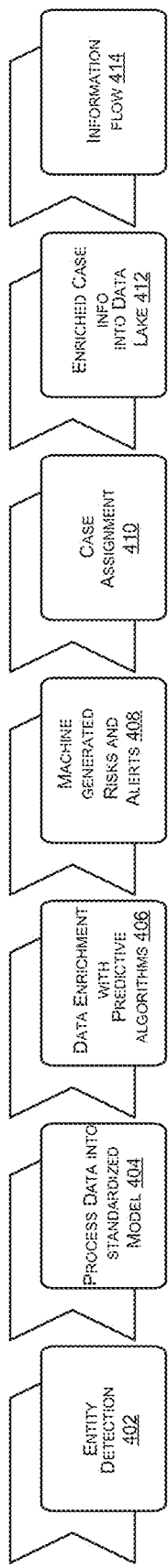
FIG. 4A illustrates an exemplary flow diagram representation of overall decision flows for managing a supply chain of products and services, according to an example embodiment of the present disclosure.
Figure 4B:
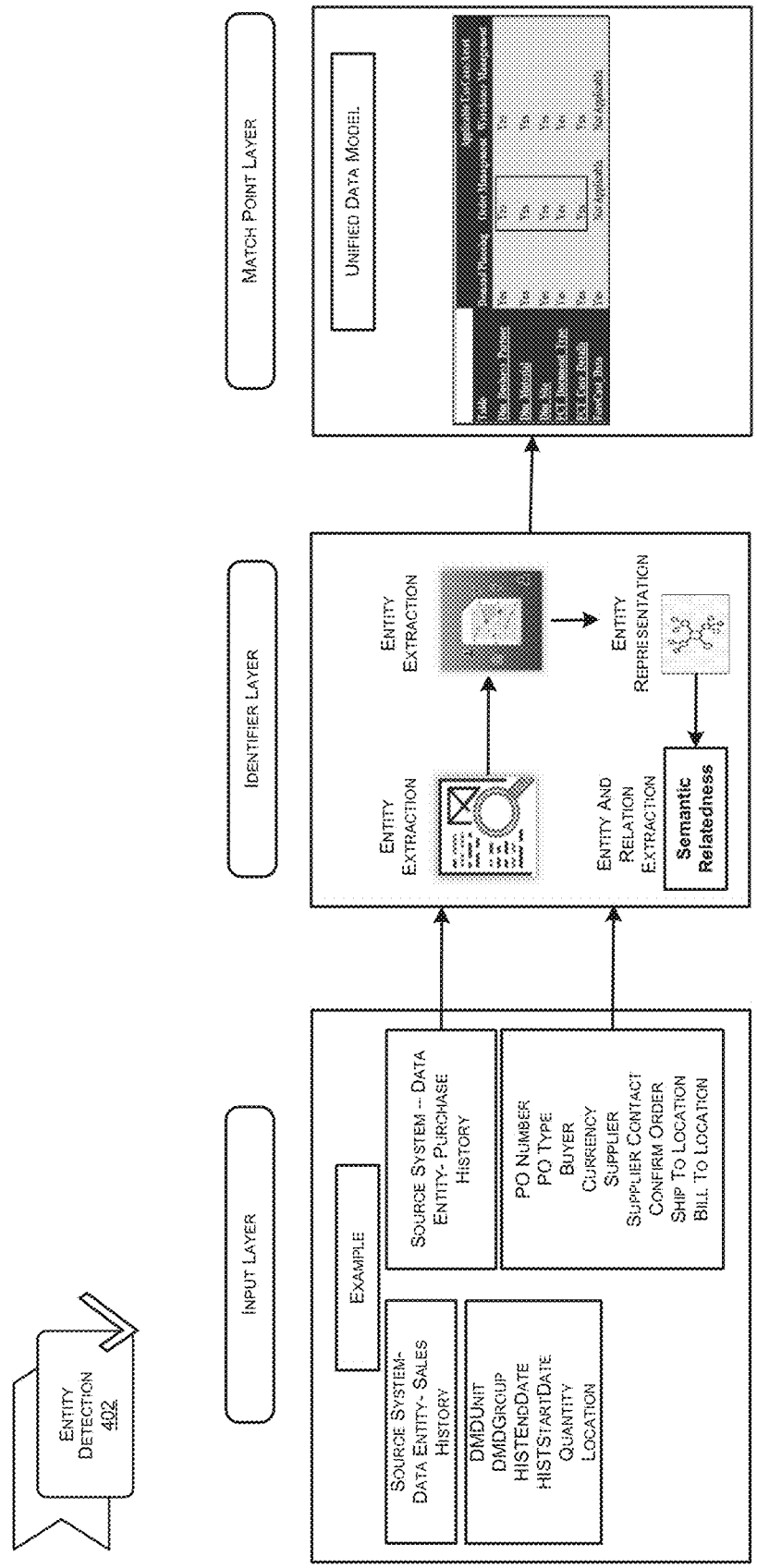
FIG. 4B illustrates an exemplary flow diagram representation of a data entity detection, according to an example embodiment of the present disclosure.

FIG. 4A illustrates an exemplary flow diagram representation of overall decision flows for managing a supply chain of products and services, according to an example embodiment of the present disclosure. The data entity may be extracted as shown in the flow diagram of FIG. 4B.

Figure 4C:
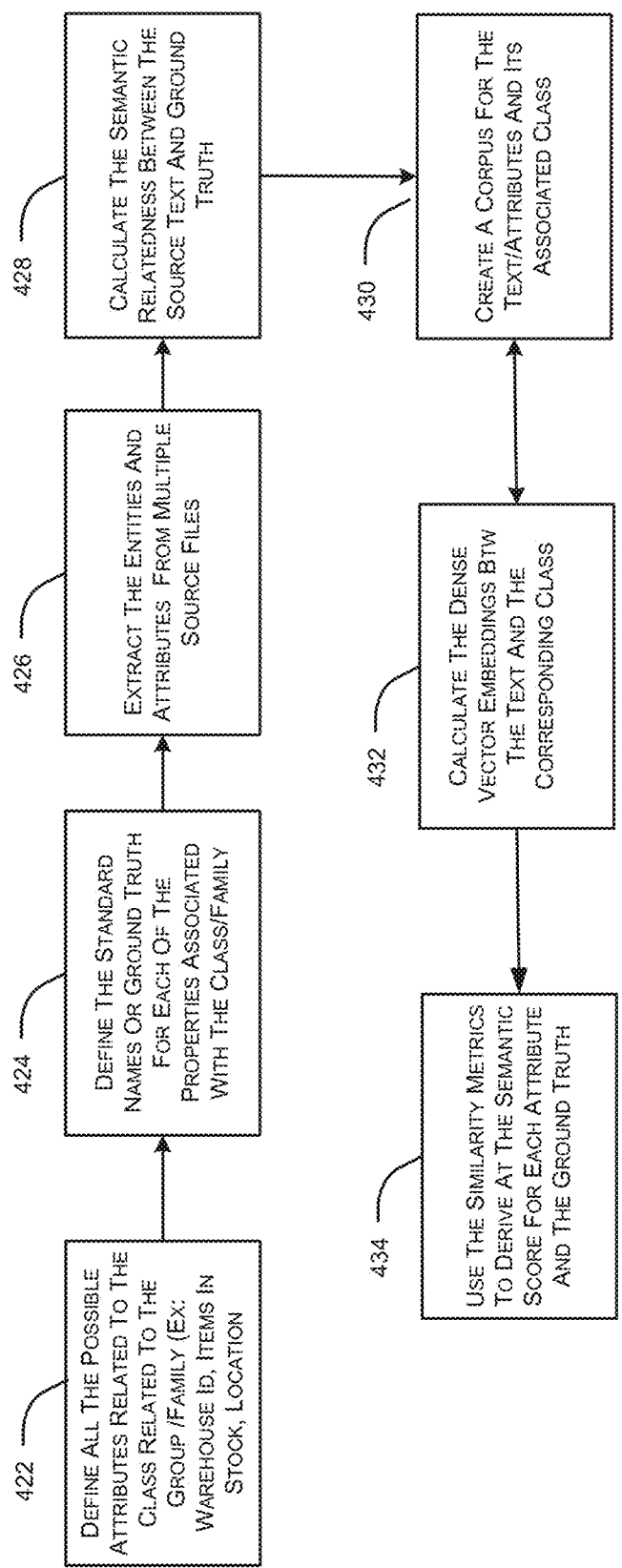
FIG. 4C illustrates an exemplary flow diagram representation of a data entity extraction method, according to an example embodiment of the present disclosure.

At step 402, the processor 102 may extract at least one data entity and a set of attributes from the generated supply chain data, to determine semantically related data entities of the extracted at least one data entity, based on a context of the historical data and ground truth data corresponding to the extracted at least one data entity. For example, the input data to the processor 102 may include sales historical data and purchase historical data. The sales historical data may include, but are not limited to, DMDUnit, DMDGroup, HISTEndDate, HISTStartDate, the number of products, location of the shipment, and the like. Further, the purchase historical data may include, but is not limited to, PO Number, PO Type, buyer, currency, supplier, supplier contact, confirm the order, ship to location, a bill to location, and the like. Further, the processor 102 may extract data entity from the sales historical data and purchase historical data. The processor 102 may extract properties from the data entity. The processor 102 may map parent and child class in the ontology schema, and the corresponding parent class is then mapped to use cases. Further, the processor 102 may represent the data entity in an entity graph, based on the extracted properties. Furthermore, the processor 102 may determine semantically related data entities of the extracted at least one data entity. The semantically related data entities may help to map to the respective use cases. FIG. 4C illustrates an exemplary flow diagram representation of a data entity extraction method, according to an example embodiment of the present disclosure.

At step 422, the processor 102, may define all possible attributes related to the class, related to the group/family (e.g., warehouse ID, items in stock, location, and the like). At step 424, the processor 102, may define the standard names or ground truth for each of the properties associated with the class/family. At step 426, the processor 102, may extract the entities and attributes from the files received from the one or more data source 212. At step 428, the processor 102, may calculate the semantic relatedness between the source text and ground truth. At step 430, the processor 102, may create a corpus for the text/attributes and associated class. At step 432, the processor 102, may calculate the dense vector embeddings between the text and the corresponding class. At step 434, the processor 102, may utilize the similarity metrics to derive at the semantic score for each attribute and the ground truth.

The similarity metrics may be determined using equation 1 below:

$$(C1,C2) = \text{Max } c \text{ subset}(C1,C2)[-\log p(C)]. \quad \text{Equation 1}$$

In the above equation 1, the variable 'C1, C2' may correspond to contexts of the two words, and the variable 'p(C)' may correspond to the error version of the context.

In another example, 'L'—defines the length of the word/text, 'w'—defines the word in raw text, 'cs'—defines the corpus, 'cs_l'—defines the corpus length, 'd_cs'—defines domain specific words, 'c'—defines the context of the given word, 'cv'—defines context vector, 'cv'=for each w in 'cs_l', maximize (w, d_cs) with p(x), maximize (w, d_cs) with p(x)–log (p(e)).

Figure 4D:
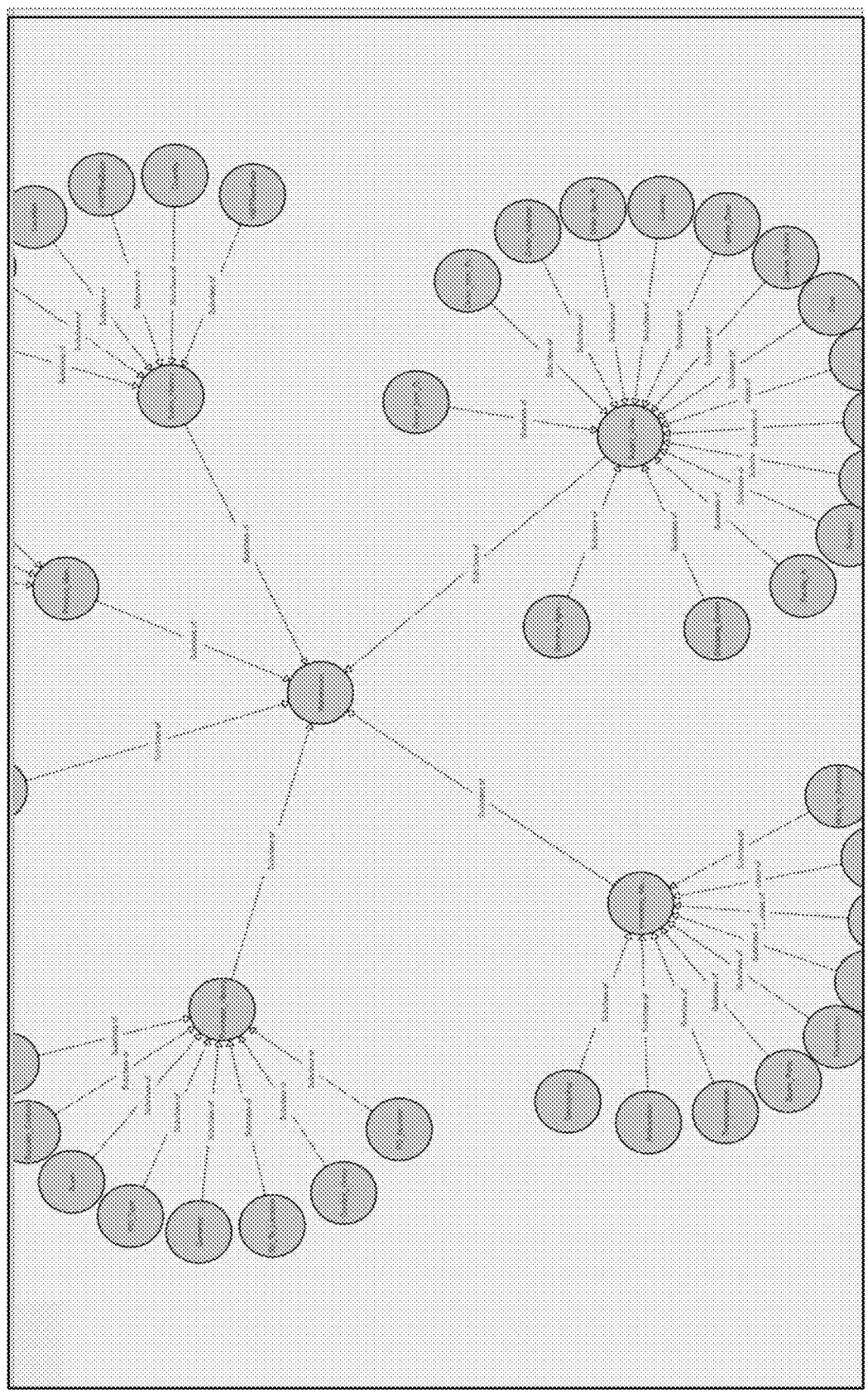
FIG. 4D illustrates an exemplary graph representation of an entity graph, according to an example embodiment of the present disclosure.
Figure 4E:
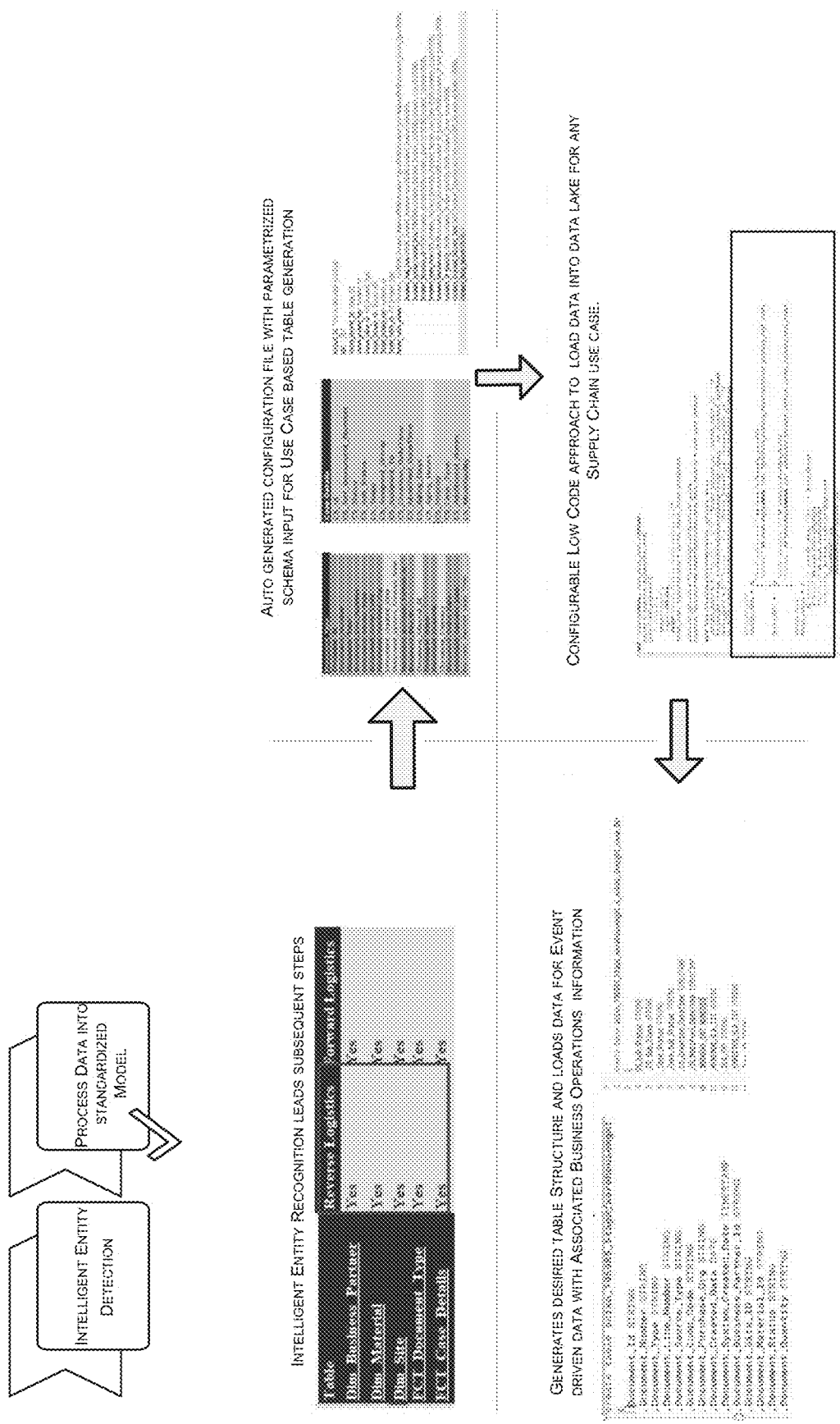
FIG. 4E illustrates an exemplary flow diagram representation of the data processing method, according to an example embodiment of the present disclosure.

FIG. 4D illustrates an exemplary graph representation of an entity graph, according to an example embodiment of the present disclosure. Further, the processor 102 may store the semantically related data entities as a unified data model. The processor 102 generates a competency score, by matching the extracted data entity with a standard target schema. FIG. 4E illustrates an exemplary flow diagram representation of the data processing method, according to an example embodiment of the present disclosure.

Referring to FIG. 4A, at step 404, the processor 102 may load data from the identity detection to a standardized model for supply chain use cases. For example, as illustrated in FIG. 4E, the processor 102 obtains data entity and generates configuration file with parametrized schema input for use case-based table generation. Further, the processor 102 may use a configurable low code approach to load data into a data lake for any supply chain use case. Further, the processor 102 generates desired table structure and loads data for event-driven data with associated business operations information.

Figure 4F:
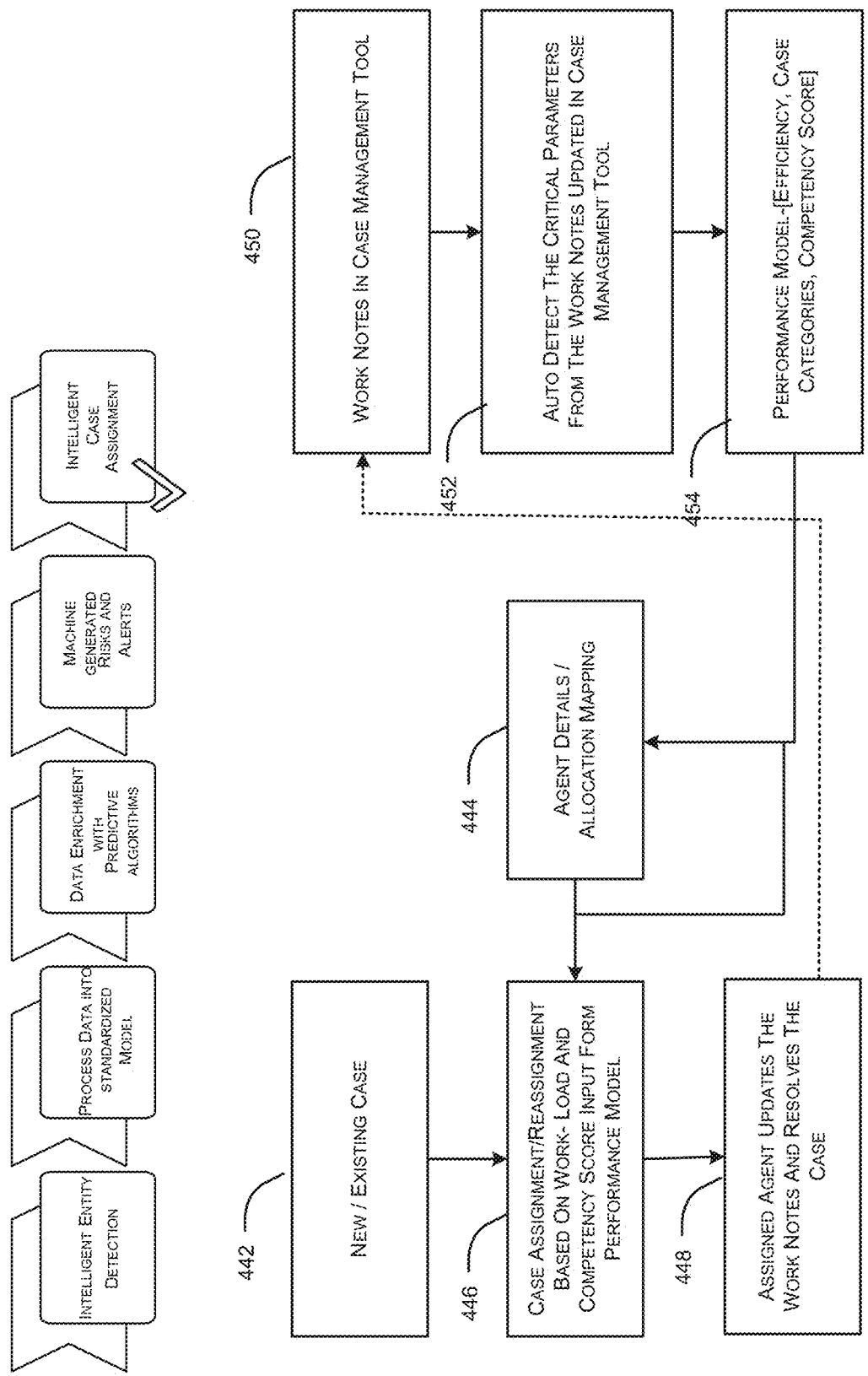
FIG. 4F illustrates an exemplary flow diagram representation of assigning work to one or more agents, according to an example embodiment of the present disclosure.

At step 406, the processor 102 may predict, from the determined at least one use case, at least one of a risk and a priority associated with the at least one of product and service in the supply chain. At step 408, the processor 102 may generate risks and alerts, based on the prediction. At step 410, the processor 102 may assign critical and high-priority use cases in the predicted at least one of risk and priority associated with the at least one of product and service, to one or more agents based on a performance score of the one or more agents. FIG. 4F illustrates an exemplary flow diagram representation of assigning work to one or more agents, according to an example embodiment of the present disclosure.

At step 442, the processor 102 may determine if the supply chain data is of a new case or an existing case. At step 444, the processor 102 may retrieve one or more agent details or task allocations. At step 446, the processor 102 may assign/reassign the case to one or more agents based on workload, and competency score from a performance model. At step 448, the processor 102 may receive work notes and resolved case data from the one or more agents.

Figure 4G:
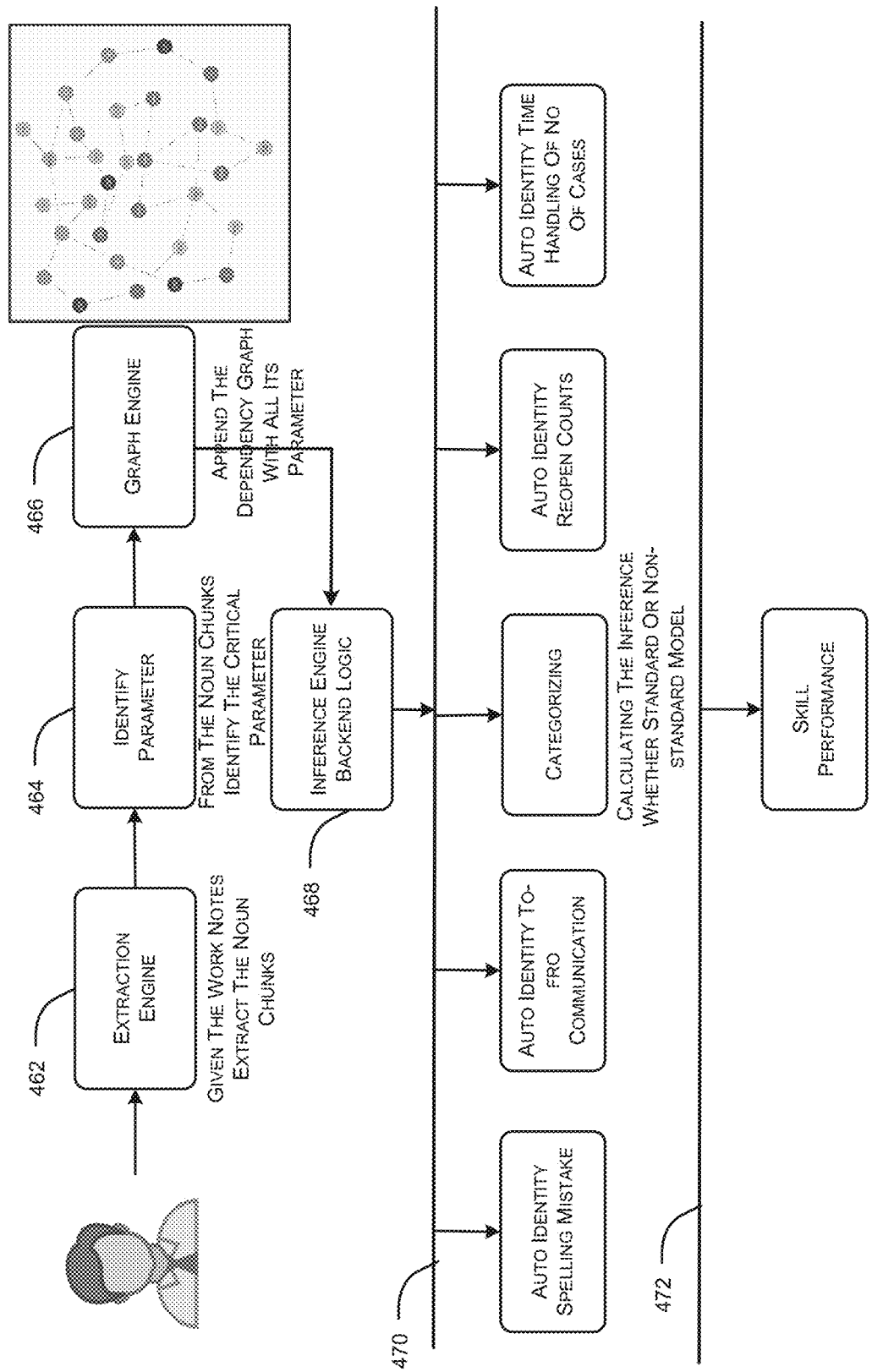
FIG. 4G illustrates an exemplary flow diagram representation of generating a dependency graph and determining a performance score of the one or more agents according to an example embodiment of the present disclosure.

At step 450, the processor 102 may provide the work notes to a case management tool. At step 452, the processor 102 may auto detect the critical parameters from the work notes updated in the case management tool (input in standard or non-standard mode, spelling mistakes, number of to-fro with customer communication, average handling time of cases, re-open count). At step 454, the processor 102 may update the performance model with efficiency, case categories, and competency score of the one or more agents based on the detected critical parameters from the work notes. FIG. 4G illustrates an exemplary flow diagram representation of generating a dependency graph and determining the performance score of the one or more agents according to an example embodiment of the present disclosure.

At step 462, the processor 102 may extract noun chunks from the retrieved work notes. At step 464, the processor 102 may identify critical parameters associated with a performance of the one or more agents. At step 466, the processor 102 may generate a dependency graph with the identified critical parameters for each of the work notes. At step 468, the processor 102 may provide the dependency graph to an inference backend logic to determine the performance score of the one or more agents. For example, consider P1, P2, P3, P3 ... Pn are the workers and W1, W2, W3 ... Wn may refer to the work notes. Further, S1, S2, S3, S4 ... Sn may refer to direct parameters from the text for each work note 'Wi' for the worker 'Pi'. Further, retrieve DS1, DS2, DS3, ..., DSn may be derived attributes from the given parameters. For each node 'Pi' in the dependency graph, the processor 102 may calculate 'CCi' which defines the centricity score for each of the resources aligned for the Work notes Wi. The centricity score is determined using equation 2 below:

$$CCi = \text{Max}(\text{Mode}(DS1/Wi, DS2/Wi, DS3/Wi \ldots DSn/Wi)) \quad \text{Equation 2}$$

Consider ID' to be the priority of the Work note, 'n' denotes the no. of Work notes resolved by the worker, and the performance score is calculated using equation 3 below:

$$\text{Final Performance Score} = CCi/p * Wi(p) \quad \text{Equation 3}$$

At step 470, the processor 102 may identify at least one of spelling mistake, communication, re-open counts of use case, and time for handling number of cases, based on generating dependency graph. The processor 102 may classify/categorize each of the work notes into a standard work note and a non-standard work note, based on the identification. Further, the processor 102 may derive a centricity score corresponding to a resource assigned for the one or more agents. At step 472, the processor 102 may generate the performance score of the one or more agents based on the classification of the work notes, the centricity score, and a resolution of the work notes by the one or more agents.

Figure 4H:
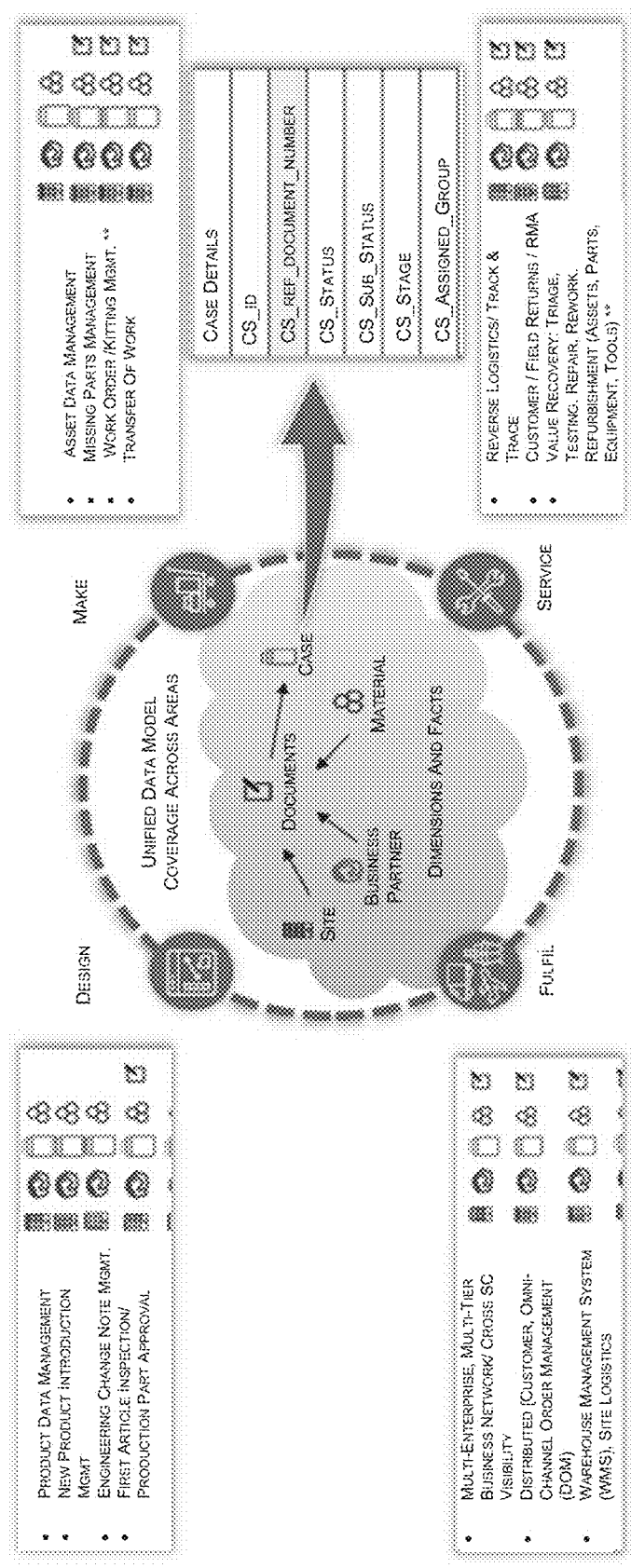
FIG. 4H illustrates an exemplary flow diagram representation of the case resolving method, according to an example embodiment of the present disclosure.

FIG. 4H illustrates an exemplary flow diagram representation of the case resolving method, according to an example embodiment of the present disclosure. At step 412, the processor 102 may store enriched case information in a data lake. Further, the processor 102 may enable visibility of the end-to-end supply chain platform with a unified supply chain data model. The system 100 may implement and provide insights of, but not limited to, product data management, new product introduction management, engineering change note management, first article inspection/production part approval, multi-enterprise, multi-tier business network/cross supply chain visibility, Distributed (customer, omnichannel) Order Management (DOM), warehouse management, site logistics, asset data management, missing parts management, work order/kitting management, transfer of work, reverse logistics/track and trace, customer/field returns/Return Material Authorization (RMA), value recovery: triage, testing. repair, rework. refurbishment (assets, parts, equipment, tools), and the like.

Figure 4I:
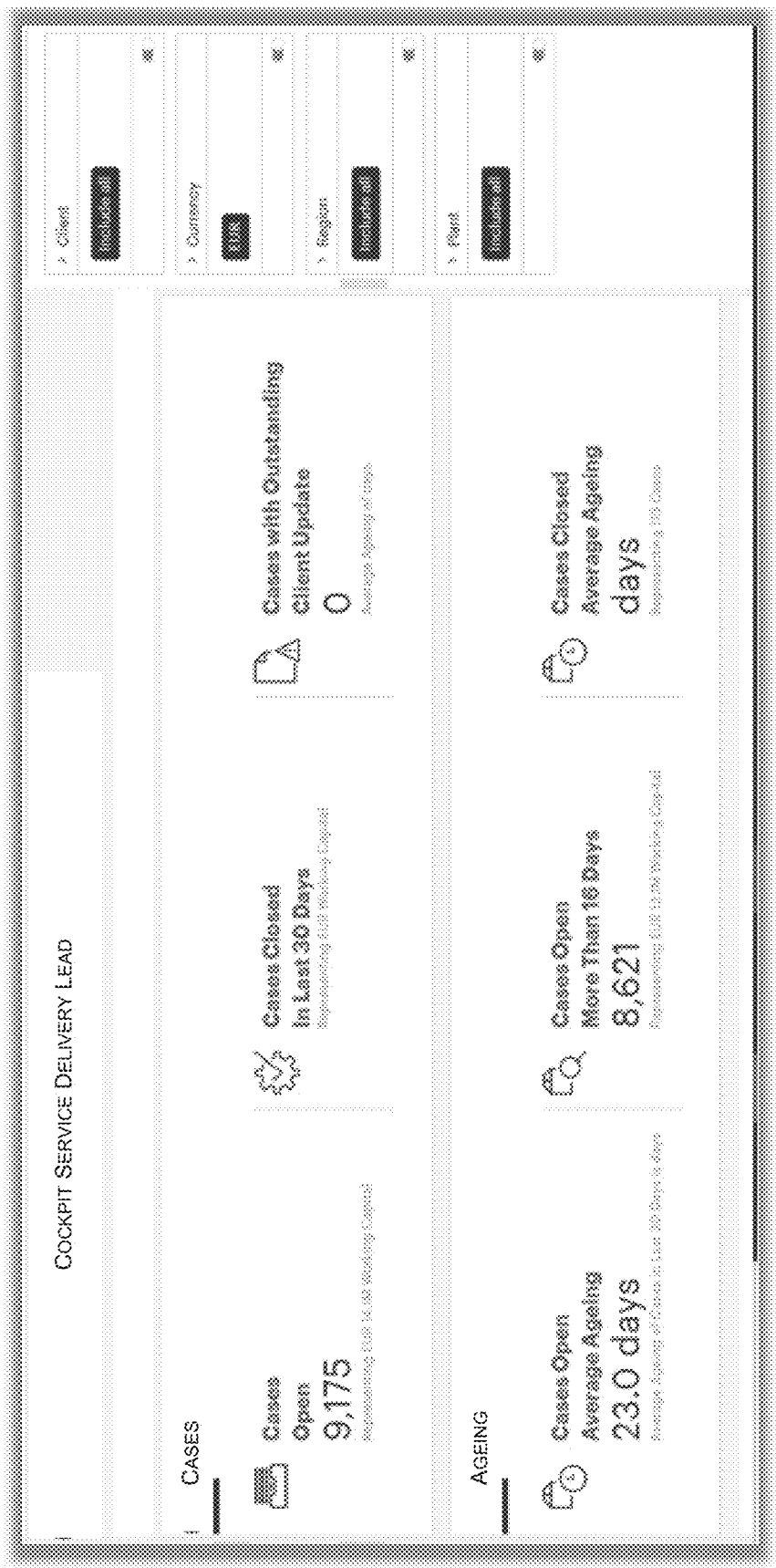
FIG. 4I illustrates an exemplary schematic diagram representation of service delivery, according to an example embodiment of the present disclosure.

FIG. 4I illustrates an exemplary schematic diagram representation of service delivery, according to an example embodiment of the present disclosure. At step 414, the processor 102 may display insights of cases and timelines. The illustration in FIG. 4I includes cases open, cases closed in the last 30 days, cases with outstanding client updates, cases open with average aging, cases open more than 16 days, cases closed with average aging, and the like.

FIG. 5 illustrates a hardware platform 500 for implementation of the disclosed system 100, according to an example embodiment of the present disclosure. For the sake of brevity, the construction, and operational features of the system 100 which are explained in detail above are not explained in detail herein. Particularly, computing machines such as but not limited to internal/external server clusters, quantum computers, desktops, laptops, smartphones, tablets, and wearables which may be used to execute the system 100 or may include the structure of the hardware platform 500. As illustrated, the hardware platform 500 may include additional components not shown, and some of the components described may be removed and/or modified. For example, a computer system with multiple GPUs may be located on external-cloud platforms including Amazon Web Services, or internal corporate cloud computing clusters, or organizational computing resources.

The hardware platform 500 may be a computer system such as the system 100 that may be used with the embodiments described herein. The computer system may represent a computational platform that includes components that may be in a server or another computer system. The computer system may execute, by the processor 505 (e.g., a single or multiple processors) or other hardware processing circuit, the methods, functions, and other processes described herein. These methods, functions, and other processes may be embodied as machine-readable instructions stored on a computer-readable medium, which may be non-transitory, such as hardware storage devices (e.g., RAM (random access memory), ROM (read-only memory), EPROM (erasable, programmable ROM), EEPROM (electrically erasable, programmable ROM), hard drives, and flash memory). The computer system may include the processor 505 that executes software instructions or code stored on a non-transitory computer-readable storage medium 510 to perform methods of the present disclosure. The software code includes, for example, instructions to gather data and documents and analyze documents. In an example, the work and data orchestration engine 106, and the visualization engine 108, may be software codes or components performing these steps.

The instructions on the computer-readable storage medium 510 are read and stored the instructions in storage 515 or in random access memory (RAM). The storage 515 may provide a space for keeping static data where at least some instructions could be stored for later execution. The stored instructions may be further compiled to generate other representations of the instructions and dynamically stored in the RAM such as RAM 520. The processor 505 may read instructions from the RAM 520 and perform actions as instructed.

The computer system may further include the output device 525 to provide at least some of the results of the execution as output including, but not limited to, visual information to users, such as external agents. The output device 525 may include a display on computing devices and virtual reality glasses. For example, the display may be a mobile phone screen or a laptop screen. GUIs and/or text may be presented as an output on the display screen. The computer system may further include an input device 530 to provide a user or another device with mechanisms for entering data and/or otherwise interact with the computer system. The input device 530 may include, for example, a keyboard, a keypad, a mouse, or a touchscreen. Each of these output devices 525 and input device 530 may be joined by one or more additional peripherals. For example, the output device 525 may be used to display the results such as bot responses by the executable chatbot.

A network communicator 535 may be provided to connect the computer system to a network and in turn to other devices connected to the network including other clients, servers, data stores, and interfaces, for example. A network communicator 535 may include, for example, a network adapter such as a LAN adapter or a wireless adapter. The computer system may include a data sources interface 540 to access the data source 545. The data source 545 may be an information resource. As an example, a database of exceptions and rules may be provided as the data source 545. Moreover, knowledge repositories and curated data may be other examples of the data source 545.

Figure 6:
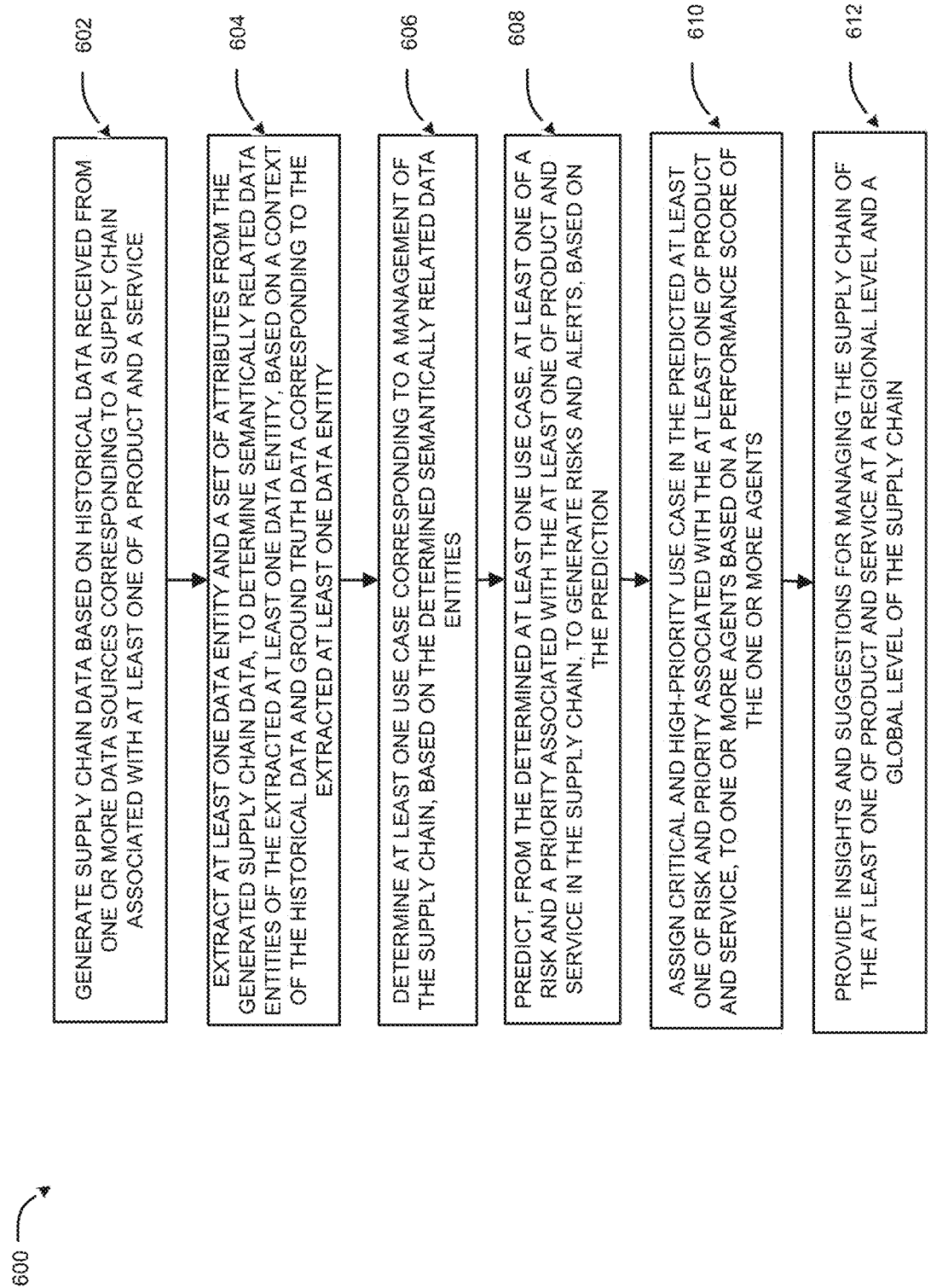
FIG. 6 illustrates a flow chart depicting a method of managing a supply chain of products and services, according to an example embodiment of the present disclosure.

FIG. 6 illustrates a flow chart depicting a method of managing a supply chain of products and services, according to an example embodiment of the present disclosure.

At block 602, the method 600 may include generating, by the processor 102 associated with the system 100, supply chain data based on historical data received from one or more data sources corresponding to a supply chain associated with at least one of a product and a service.

At block 604, the method 600 may include extracting, by the processor 102, at least one data entity and a set of attributes from the generated supply chain data, to determine semantically related data entities of the extracted at least one data entity, based on a context of the historical data and ground truth data corresponding to the extracted at least one data entity.

At block 606, the method 600 may include determining, by the processor 102, at least one use case corresponding to a management of the supply chain, based on the determined semantically related data entities.

At block 608, the method 600 may include predicting, by the processor 102, from the determined at least one use case, at least one of a risk and a priority associated with the at least one of product and service in the supply chain, to generate risks and alerts, based on the prediction.

At block 610, the method 600 may include assigning, by the processor 102, critical and high-priority use cases in the predicted at least one of risk and priority associated with the at least one of product and service, to one or more agents based on a performance score of the one or more agents.

At block 612, the method 600 may include providing, by the processor 102, insights, and suggestions for managing the supply chain of the at least one of product and service at a regional level and a global level of the supply chain.

The order in which the method 600 is described is not intended to be construed as a limitation, and any number of the described method blocks may be combined or otherwise performed in any order to implement the method 600 or an alternate method. Additionally, individual blocks may be deleted from the method 600 without departing from the spirit and scope of the present disclosure described herein. Furthermore, the method 600 may be implemented in any suitable hardware, software, firmware, or a combination thereof, that exists in the related art or that is later developed. The method 600 describes, without limitation, the implementation of the system 100. A person of skill in the art will understand that method 600 may be modified appropriately for implementation in various manners without departing from the scope and spirit of the disclosure.

One of ordinary skill in the art will appreciate that techniques consistent with the present disclosure are applicable in other contexts as well without departing from the scope of the disclosure.

What has been described and illustrated herein are examples of the present disclosure. The terms, descriptions, and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

We claim:

1. A system to integrate and consolidate data across disparate planning systems for supply chain management, the system comprising:
a processor including a data orchestration engine a visualization engine, and a data analytics engine; and
the disparate planning systems including one or more supplier devices, one or more client devices, and one or more customer devices, communicatively coupled to an integration hub in a network architecture of the system;
a memory coupled to the processor, wherein the processor comprises processor executable instructions, which on execution, cause the processor to:
generate supply chain data based on historical data received from one or more data sources, live data and exceptions master data received from the one or more supplier devices, the one or more client devices, and the one or more customer devices via the integration hub, wherein the historical data, the live data, and the exceptions master data correspond to a supply chain associated with at least one of a product and a service;
extract, by the data analytics engine, the live data, the exceptions master data and the historical data, by enabling and authorizing data access for data preparation through data cleansing, quality check, and data blending to transform the live data, the exceptions master data, and the historical data from the desperate planning systems;
determine semantically-related data entities of the extracted at least one data entity as a unified model, by extracting at least one data entity and a set of attributes from the generated supply chain data, based on a context of the historical data and ground truth data corresponding to the at least one data entity, wherein, for extracting at least one data entity and the set of attributes, the processor is further configured to:
define, the set of attributes of the at least one data entity using files from one or more data sources, related to the class;
define at least one of at least one standard name and the ground truth data for each of class properties associated with the class;
extract the at least one data entity and the set of attributes from the files received from the one or more data sources;
extract entity properties from the extracted at least one data entity and the set of attributes, wherein to extract the entity properties, the processor is configured to:
determine a semantic relatedness between a source text and the ground truth data corresponding to the extracted at least one data entity, wherein the ground truth data correspond to at least one of pre-determined data and pre-defined standard class names for the class properties associated with the class,
create a corpus for the source text and the associated class based on the semantic relatedness,
determine a dense vector embeddings between the source text and the corresponding class, based on the generated at least one of the at least one standard name and the ground truth data, and determine, based on the dense vector embeddings, a semantic score for each attribute of the set of attributes and the ground truth data for deriving a similarity metrics;

generate an entity graph comprising nodes and edges, based on the derived semantic score, corresponding to the extracted at least one data entity and the entity properties;

determine one or more relationships of the semantically related data entities, based on the generated entity graph; and map the determined one or more relationships to at least one use case;

determine the at least one use case corresponding to a management of the supply chain, based on the determined semantically related data entities;

generate risks and alerts, by predicting, from the determined at least one use case, at least one of a risk and a priority associated with the at least one of product and service in the supply chain, based on the prediction, wherein generating the risks and alerts comprises:

generating a use case-based table corresponding to at least one use case, by generating a configuration file associated with parameterized schema input based on the historical data, the live data, and the exceptions master data correspond to the supply chain associated with the at least one of product and service;

loading, by using a configurable low code approach, the use case-based table into a data lake for the at least one use case with associated operations information related to the at least one of product and service;

retrieving, from the data lake, information for event-driven operations associated with the supply chain;

generating, by accessing the data lake and based on a priority associated with the at least one of product and service, the risks and alerts; integrate the generated risks and alerts associated with the at least one of product and service across disparate planning systems in the supply chain; and provide insights, based on the at least one of risk and priority associated with the at least one of product and service, for managing the supply chain, wherein the insights provide information about the at least one use case by enabling cross-functional decision making across the disparate planning systems.

2. The system as claimed in claim 1, wherein, for assigning critical and high-priority use case to one or more agents, the processor is further configured to:

retrieve one or more work notes corresponding to the one or more agents, from the one or more data sources;

extract noun chunks from the retrieved work notes, to identify critical parameters associated with a performance of the one or more agents;

generate a dependency graph with the identified critical parameters for each of the work notes;

identify at least one of a spelling mistake, communication, re-open counts of use case, time for handling number of cases, based on generating dependency graph;

classify each of the work notes into a standard work note and a non-standard work note, based on the identification;

derive centricity score corresponding to a resource assigned for the one or more agents; and generate the performance score of the one or more agents based on the classification of the work notes, the centricity score, and a resolution of the work notes by the one or more agents.

3. The system as claimed in claim 1, wherein, for extracting the at least one data entity, the processor is further configured to:

map a parent class and a child class corresponding to the at least one data entity into a supply chain-based ontology schema; and map the parent class to the at least one use case.

4. The system as claimed in claim 1, wherein the at least one use case corresponds to at least one of a warehouse, a product management, a purchase history, an inventory management, and a supply chain.

5. The system as claimed in claim 1, wherein the insights comprise information associated with at least one of goods in transit, reverse logistics, track and trace, field returns, return merchandise authorization, triage, testing, repair, rework, refurbishment, distribution, inspection, refund, transfer, work order, and delivery address issue corresponding to the at least one of product and service.

6. The system as claimed in claim 1, wherein the ground truth data correspond to at least one of pre-defined data and pre-defined standard class names for class properties associated with the class.

7. The system as claimed in claim 2, wherein the noun chunks are extracted using at least one of a Natural Language Processing (NLP) technique, and a text analytics technique.

8. A method to integrate and consolidate data across disparate planning systems for supply chain management, the method comprising:

generating, by a data orchestration engine, supply chain data based on historical data received from one or more data sources, live data and exceptions master data received from one or more supplier devices, one or more client devices, and one or more customer devices via an integration hub, wherein the historical data, the live data, and the exceptions master data correspond to a supply chain associated with at least one of a product and a service;

extracting, by a data analytics engine, the live data, the exceptions master data and the historical data, by enabling and authorizing data access for data preparation through data cleansing, quality check, and data blending to transform the live data, the exceptions master data, and the historical data from the disparate planning systems;

determining semantically-related data entities of the extracted at least one data entity as a unified model, by the data orchestration engine, by extracting at least one data entity and a set of attributes from the generated supply chain data, based on a context of the historical data and ground truth data corresponding to the extracted at least one data entity, wherein extracting at least one data entity and the set of attributes further comprises:

defining, the set of attributes of the at least one data entity using files from one or more data sources, related to the class;

defining at least one of at least one standard name and ground truth data for each of class properties associated with the class;

extracting the at least one data entity and the set of attributes from the files received from the one or more data sources;

extracting, by the data orchestration engine, entity properties from the extracted at least one data entity and the set of attributes, further comprises:
  determining a semantic relatedness between a source text and the ground truth data corresponding to the extracted at least one data entity, wherein a ground truth data correspond to at least one of pre-determined data and pre-defined standard class names for the class properties associated with the class,
  creating a corpus for the text and the associated class based on the semantic relatedness,
  determining a dense vector embeddings between the text and the corresponding class, based on the generated at least one of the at least one standard name and the ground truth data; and
  determining, based on the dense vector embeddings, a semantic score for each attribute of the set of attributes and the ground truth data for deriving a similarity metrics;
generating, by the data orchestration engine, an entity graph comprising nodes and edges, based on the derived semantic score, corresponding to the extracted at least one data entity and the entity properties;
determining, by the data orchestration engine, one or more relationships of the semantically related data entities, based on the generated entity graph; and
mapping, by the data orchestration engine, the determined one or more relationships to at least one use case;
determining, by the data orchestration engine, the at least one use case corresponding to a management of the supply chain, based on the determined semantically related data entities;
generating risks and alerts, by the data orchestration engine, by predicting from the determined at least one use case, at least one of a risk and a priority associated with the at least one of product and service in the supply chain, based on the prediction, wherein generating the risks and alerts comprising:
  generating a use case-based table corresponding to at least one use case, by generating a configuration file associated with parameterized schema input based on the historical data, the live data, and the exceptions master data correspond to the supply chain associated with the at least one of product and service;
  loading, by using a configurable low code approach, the use case-based table into a data lake for the at least one use case with associated operations information related to the at least one of product and service;
  retrieving, from the data lake, information for event-driven operations associated with the supply chain;
  generating, by accessing the data lake and based on a priority associated with the at least one of product and service, the risks and alerts;
integrating the generated risks and alerts associated with the at least one of product and service across disparate planning systems in the supply chain;
providing insights and suggestions, by the processor, at least one of risk and priority associated with the at least one of product and service, for managing the supply chain, wherein the insights provide information about the at least one use case by enabling cross-functional decision making across disparate planning systems.

9. The method as claimed in claim 8, wherein assigning critical and high-priority use case to one or more agents further comprises:
  retrieving, by the processor, one or more work notes corresponding to the one or more agents, from the one or more data sources;
  extracting, by the processor, noun chunks from the retrieved work notes, to identify critical parameters associated with a performance of the one or more agents;
  generating, by the processor, a dependency graph with the identified critical parameters for each of the work notes;
  identifying, by the processor, at least one of spelling mistake, communication, re-open counts of use case, time for handling number of cases, based on generating dependency graph;
  classifying, by the processor, each of the work notes into a standard work note and a non-standard work note, based on the identification;
  deriving, by the processor, centricity score corresponding to a resource assigned for the one or more agents; and
  generating, by the processor, the performance score of the one or more agents based on the classification of the work notes, the centricity score, and a resolution of the work notes by the one or more agents.

10. The method as claimed in claim 8, wherein extracting the at least one data entity further comprises:
  mapping, by the processor, a parent class, and a child class corresponding to the at least one data entity into a supply chain-based ontology schema; and
  mapping, by the processor, the parent class to the at least one use case.

11. The method as claimed in claim 8, wherein the at least one use case corresponds to at least one of a warehouse, a product management, a purchase history, an inventory management, and a supply chain.

12. The method as claimed in claim 8, wherein the insights comprise information associated with at least one of goods in transit, reverse logistics, track and trace, field returns, return merchandise authorization, triage, testing, repair, rework, refurbishment, distribution, inspection, refund, transfer, work order, and delivery address issue corresponding to the at least one of product and service.

13. The method as claimed in claim 8, wherein the ground truth data corresponds to at least one of pre-defined data and pre-defined standard class names for class properties associated with the class.

14. The method as claimed in claim 9, wherein the noun chunks are extracted using at least one of a Natural Language Processing (NLP) technique, and a text analytics technique.

15. A non-transitory computer-readable medium comprising machine-readable instructions that are executable by a processor to:
  generate supply chain data based on historical data received from one or more data sources, live data and exceptions master data received from one or more supplier devices, one or more client devices, and one or more customer devices via the integration hub, wherein the historical data, the live data, and the exceptions master data correspond a supply chain associated with at least one of a product and a service;
  extract, by a data analytics engine, the live data, the exceptions master data and the historical data, by enabling and authorizing data access for data preparation through data cleansing, quality check, and data blending to transform the live data, the exceptions master data, and the historical data from disparate planning systems;

determine semantically-related data entities of the extracted at least one data entity as a unified model, by extracting at least one data entity and a set of attributes from the generated supply chain data, based on a context of the historical data and ground truth data corresponding to the at least one data entity wherein, for extracting at least one data entity and the set of attributes, the processor is further configured to:

define, the set of attributes of the at least one data entity using files from one or more data sources, related to the class;

define at least one of at least one standard name and ground truth data for each of class properties associated with the class;

extract the at least one data entity and the set of attributes from the files received from the one or more data sources;

extract entity properties from the extracted at least one data entity and the set of attributes, the processor is further configured to:

determine a semantic relatedness between a source text and the ground truth data corresponding to the extracted at least one data entity, wherein a ground truth data correspond to at least one of predetermined data and pre-defined standard class names for the class properties associated with the class, create a corpus for the text and the associated class based on the semantic relatedness, determine a dense vector embeddings between the text and the corresponding class, based on the generated at least one of the at least one standard name and the ground truth data; and determine, based on the dense vector embeddings, a semantic score for each attribute of the set of attributes and the ground truth data for deriving a similarity metrics;

generate an entity graph comprising nodes and edges, based on the derived semantic score, corresponding to the extracted at least one data entity and the entity properties;

determine one or more relationships of the semantically related data entities, based on the generated entity graph; and map the determined one or more relationships to at least one use case;

determine the at least one use case corresponding to a management of the supply chain, based on the determined semantically related data entities;

generate risks and alerts, by predicting, from the determined at least one use case, at least one of a risk and a priority associated with the at least one of product and service in the supply chain, based on the prediction, wherein generating the risks and alerts comprising:

generating a use case-based table corresponding to at least one use case, by generating a configuration file associated with parameterized schema input based on the historical data, the live data, and the exceptions master data correspond to the supply chain associated with the at least one of product and service;

loading, by using a configurable low code approach, the use case-based table into a data lake for the at least one use case with associated operations information related to the at least one of product and service;

retrieving, from the data lake, information for event-driven operations associated with the supply chain;

generating, by accessing the data lake and based on a priority associated with the at least one of product and service, the risks and alerts;

integrate the generated risks and alerts associated with the at least one of product and service across disparate planning systems in the supply chain;

provide insights and suggestions, at least one of risk and priority associated with the at least one of product and service, for managing the supply chain, wherein the insights provide information about the at least one use case by enabling cross-functional decision making across disparate planning systems.

* * * * *